United States Patent
You et al.

(10) Patent No.: US 10,219,265 B2
(45) Date of Patent: Feb. 26, 2019

(54) DOWNLINK SIGNAL RECEPTION METHOD AND USER EQUIPMENT, AND DOWNLINK SIGNAL TRANSMISSION METHOD AND BASE STATION

(71) Applicant: LG ELECTRONICS INC., Seoul (KR)

(72) Inventors: Hyangsun You, Seoul (KR); Kijun Kim, Seoul (KR); Yunjung Yi, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 15/500,874

(22) PCT Filed: Jul. 29, 2015

(86) PCT No.: PCT/KR2015/007948
§ 371 (c)(1),
(2) Date: Jan. 31, 2017

(87) PCT Pub. No.: WO2016/018079
PCT Pub. Date: Feb. 4, 2016

(65) Prior Publication Data
US 2017/0223686 A1      Aug. 3, 2017

Related U.S. Application Data

(60) Provisional application No. 62/031,875, filed on Aug. 1, 2014, provisional application No. 62/044,430, filed on Sep. 2, 2014.

(51) Int. Cl.
*H04W 72/04*     (2009.01)
*H04L 5/00*      (2006.01)

(52) U.S. Cl.
CPC .......... *H04W 72/042* (2013.01); *H04L 5/005* (2013.01); *H04L 5/0048* (2013.01); *H04L 5/0007* (2013.01); *H04L 5/0064* (2013.01)

(58) Field of Classification Search
None
See application file for complete search history.

(56) References Cited

U.S. PATENT DOCUMENTS

| 2013/0016694 | A1  | 1/2013  | Nimbalker et al. |
| 2013/0163573 | A1* | 6/2013  | Oizumi ................. H04L 5/0007 370/336 |
| 2014/0355558 | A1* | 12/2014 | Zhang ................... H04W 28/06 370/330 |

FOREIGN PATENT DOCUMENTS

| CN | 102448122  | 5/2012  |
| WO | 2013188340 | 12/2013 |
| WO | 2014110467 | 7/2014  |

OTHER PUBLICATIONS

PCT International Application No. PCT/KR2015/007948, Written Opinion of the International Searching Authority dated Nov. 16, 2015, 21 pages.

(Continued)

*Primary Examiner* — Christine T Duong
(74) *Attorney, Agent, or Firm* — Lee, Hong, Degerman, Kang & Waimey

(57) ABSTRACT

The present invention provides a method and a device for transmitting/receiving a downlink signal. If the number of reference signals is greater than a certain level when the size of a transmission block to the transmitted through a downlink is determined, the present invention transmits/receives a downlink signal in a reduced transmission block size smaller than a transmission block size according to a modulation and coding scheme to be used for the downlink signal, and/or the number of resource blocks.

8 Claims, 16 Drawing Sheets

(56) References Cited

OTHER PUBLICATIONS

3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.2.0, Jun. 2014, 208 pages.

* cited by examiner

| e.g., RIV=47 | | | | | | | | | | | | | | | |
|---|---|---|---|---|---|---|---|---|---|---|---|---|---|---|---|
| VRB index | 0 | 1 | 2 | 3 | 4 | 5 | 6 | 7 | 8 | 9 | 10 | 11 | 12 | 13 | 14 |

| L \ S | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 |
| 2 | 15 | 16 | 17 | 18 | 19 | 20 | 21 | 22 | 23 | 24 | 25 | 26 | 27 | 28 | 29 |
| 3 | 30 | 31 | 32 | 33 | 34 | 35 | 36 | 37 | 38 | 39 | 40 | 41 | 42 | 43 | 44 |
| 4 | 45 | 46 | 47 | 48 | 49 | 50 | 51 | 52 | 53 | 54 | 55 | 56 | 57 | 58 | 59 |
| 5 | 60 | 61 | 62 | 63 | 64 | 65 | 66 | 67 | 68 | 69 | 70 | 71 | 72 | 73 | 74 |
| 6 | 75 | 76 | 77 | 78 | 79 | 80 | 81 | 82 | 83 | 84 | 85 | 86 | 87 | 88 | 89 |
| 7 | 90 | 91 | 92 | 93 | 94 | 95 | 96 | 97 | 98 | 99 | 100 | 101 | 102 | 103 | 104 |
| 8 | 105 | 106 | 107 | 108 | 109 | 110 | 111 | 112 | 113 | 114 | 115 | 116 | 117 | 118 | 119 |
| 9 | 119 | 118 | 117 | 116 | 115 | 114 | 113 | 112 | 111 | 110 | 109 | 108 | 107 | 106 | 105 |
| 10 | 104 | 103 | 102 | 101 | 100 | 99 | 98 | 97 | 96 | 95 | 94 | 93 | 92 | 91 | 90 |
| 11 | 89 | 88 | 87 | 86 | 85 | 84 | 83 | 82 | 81 | 80 | 79 | 78 | 77 | 76 | 75 |
| 12 | 74 | 73 | 72 | 71 | 70 | 69 | 68 | 67 | 66 | 65 | 64 | 63 | 62 | 61 | 60 |
| 13 | 59 | 58 | 57 | 56 | 55 | 54 | 53 | 52 | 51 | 50 | 49 | 48 | 47 | 46 | 45 |
| 14 | 44 | 43 | 42 | 41 | 40 | 39 | 38 | 37 | 36 | 35 | 34 | 33 | 32 | 31 | 30 |
| 15 | 29 | 28 | 27 | 26 | 25 | 24 | 23 | 22 | 21 | 20 | 19 | 18 | 17 | 16 | 15 |

FIG. 14
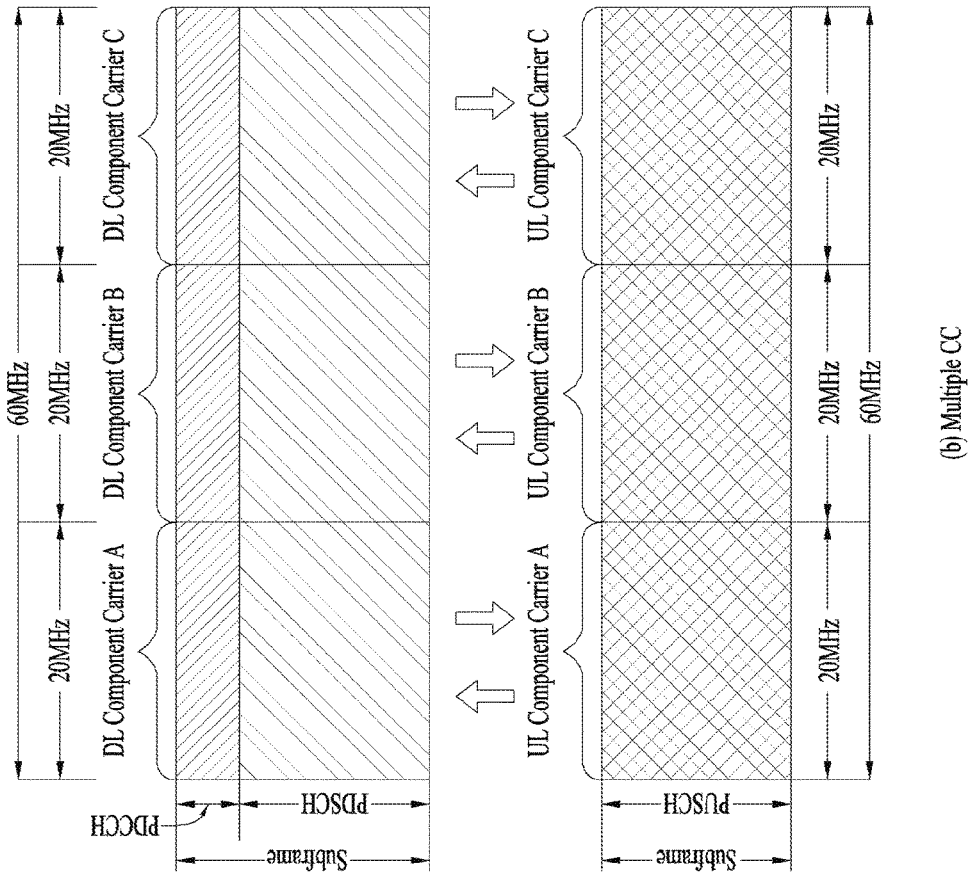
(b) Multiple CC
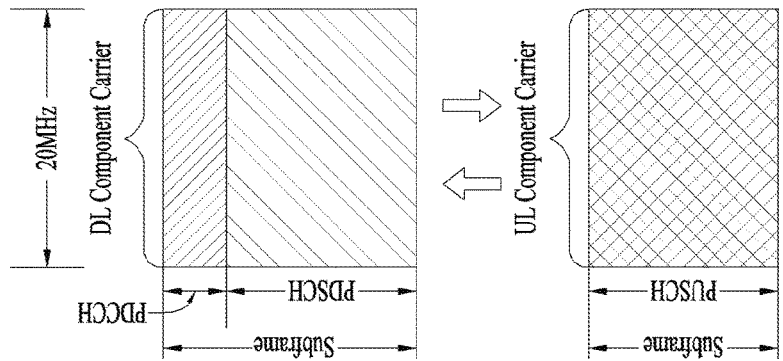
(a) Single CC

FIG. 16
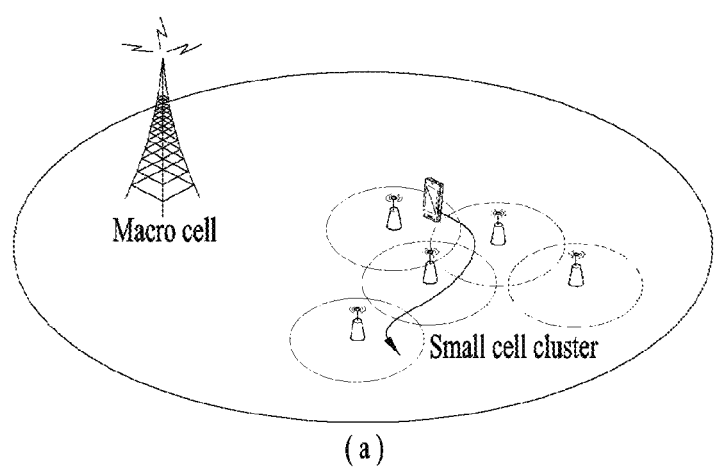
(a)
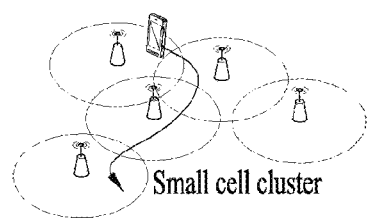
(b)

DOWNLINK SIGNAL RECEPTION METHOD AND USER EQUIPMENT, AND DOWNLINK SIGNAL TRANSMISSION METHOD AND BASE STATION

CROSS-REFERENCE TO RELATED APPLICATIONS

This application is the National Stage filing under 35 U.S.C. 371 of International Application No. PCT/KR2015/007948, filed on Jul. 29, 2015, which claims the benefit of U.S. Provisional Application Nos. 62/031,875, filed on Aug. 1, 2014, and 62/044,430, filed on Sep. 2, 2014, the contents of which are all hereby incorporated by reference herein in their entirety.

TECHNICAL FIELD

The present invention relates to a wireless communication system and, more particularly, to a method of transmitting or receiving downlink signal and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

In addition, a method of efficiently transmitting/receiving, on finite radio resources, a reference signal that a reception device uses to restore a control signal and/or a data signal that a transmission device transmits is also needed.

The technical objects that can be achieved through the present invention are not limited to what has been particularly described hereinabove and other technical objects not described herein will be more clearly understood by persons skilled in the art from the following detailed description.

Technical Solutions

According to an aspect of the present invention, in determining a transport block size transmitted on downlink, if the number of reference signals is greater than a predetermined level, a downlink signal is transmitted/received with a reduced transport block size relative to a transport block size according to a modulation and coding scheme and/or the number of resource blocks used for the downlink signal.

In an aspect of the present invention, provided herein is a method of receiving a downlink signal by a user equipment (UE), including receiving downlink control information (DCI) including modulation and coding scheme (MCS) information and including resource allocation information indicating one or more physical resource blocks (PRBs) allocated to the UE; and receiving downlink data through a physical downlink shared channel (PDSCH) mapped to the one or more PRBs allocated to the UE based on the DCI. A transport block size of the downlink data among a plurality of predefined transport block sizes may be determined based on the MCS information and the number, $N'_{PRB}$, of the PRBs allocated to the UE. If the density of downlink reference signals is greater than a reference value, the transport block size may be determined based on the number, $N_{PRB}$, of reduced PRBs rather than on $N_{PRB}'$.

In another aspect of the present invention, provided herein is a user equipment (UE) for receiving a downlink signal, including a radio frequency (RF) unit configured to transmit or receive a signal and a processor configured to control the RF unit. The processor may be configured to control the RF unit to receive downlink control information (DCI) including modulation and coding scheme (MCS) information and including resource allocation information indicating one or more physical resource blocks (PRBs) allocated to the UE. The processor may be configured to control the RF unit to receive downlink data through a physical downlink shared channel (PDSCH) mapped to the PRBs allocated to the UE based on the DCI. The processor may be configured to determine a transport block size of the downlink data among a plurality of predefined transport block sizes, based on the MCS information and the number, $N'_{PRB}$, of the PRBs. If the density of downlink reference signals is greater than a reference value, the processor may be configured to determine the transport block size based on the number, $N_{PRB}$, of reduced PRBs rather than on $N_{PRB}'$.

In another aspect of the present invention, provided herein is a method of transmitting a downlink signal by a base station (BS), including determining a transport block size of downlink data among a plurality of predefined transport block sizes according to modulation and coding schemes (MCSs) and the number of physical resource blocks (PRBs); transmitting, to a user equipment (UE), downlink control information (DCI) including MCS information for transmission of the downlink data and including resource allocation information indicating PRBs allocated to the UE; and transmitting the downlink data through a physical downlink shared channel (PDSCH) mapped to the PRBs allocated to the UE according to the DCI. If the density of downlink reference signals is greater than a reference value, the transport block size may be determined based on the number, $N_{PRB}$, of reduced PRBs rather than on the number, $N_{PRB}$, of the PRBs allocated to the UE.

In another aspect of the present invention, provided herein is a method a base station (BS) for transmitting a downlink signal, the BS including a radio frequency (RF) unit configured to transmit or receive a signal and a processor configured to control the RF unit. The processor may be configured to determine a transport block size of downlink data among a plurality of predefined transport block sizes according to modulation and coding schemes (MCSs) and the number of physical resource blocks (PRBs). The processor may be configured to control the RF control to transmit, to a user equipment (UE), downlink control information (DCI) including MCS information for transmission of the downlink data and including resource allocation information indicating PRBs allocated to the UE. The processor may be configured to control the RF unit to transmit the downlink data through a physical downlink shared channel (PDSCH) mapped to the PRBs allocated to the UE according to the DCI. If the density of downlink reference signals is greater than a reference value, the transport block size may be determined based on the number, $N_{PRB}$, of reduced PRBs rather than on the number, $N'_{PRB}$, of the PRBs allocated to the UE.

In each aspect of the present invention, $N_{PRB}$ may be given by at least $N_{PRB}=\max\{\text{floor}(N_{PRB}'\times\alpha),1\}$, $N_{PRB}=\text{floor}(N_{PRB}'\times\alpha)$, or $N_{PRB}=\text{ceil}(N_{PRB}'\times\alpha)$ and $\alpha$ may be a positive real number less than 1.

In each aspect of the present invention, $\alpha$ may be determined based on the ratio, $N_{RE}'/N_{RE}$, of the number, $N_{RE}'$, of resource elements excluding resource elements used to receive the downlink reference signals from $N_{RE}$ to the number, $N_{RE}$, of resource elements excluding resource elements included in orthogonal frequency division multiplexing (OFDM) symbols used to transmit a physical downlink control channel (PDCCH) from resource elements in a resource block.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 14 is a diagram for explaining single-carrier communication and multi-carrier communication.

FIG. 16 illustrates the concept of a small cell.

MODE FOR CARRYING OUT THE INVENTION

Figure 1:
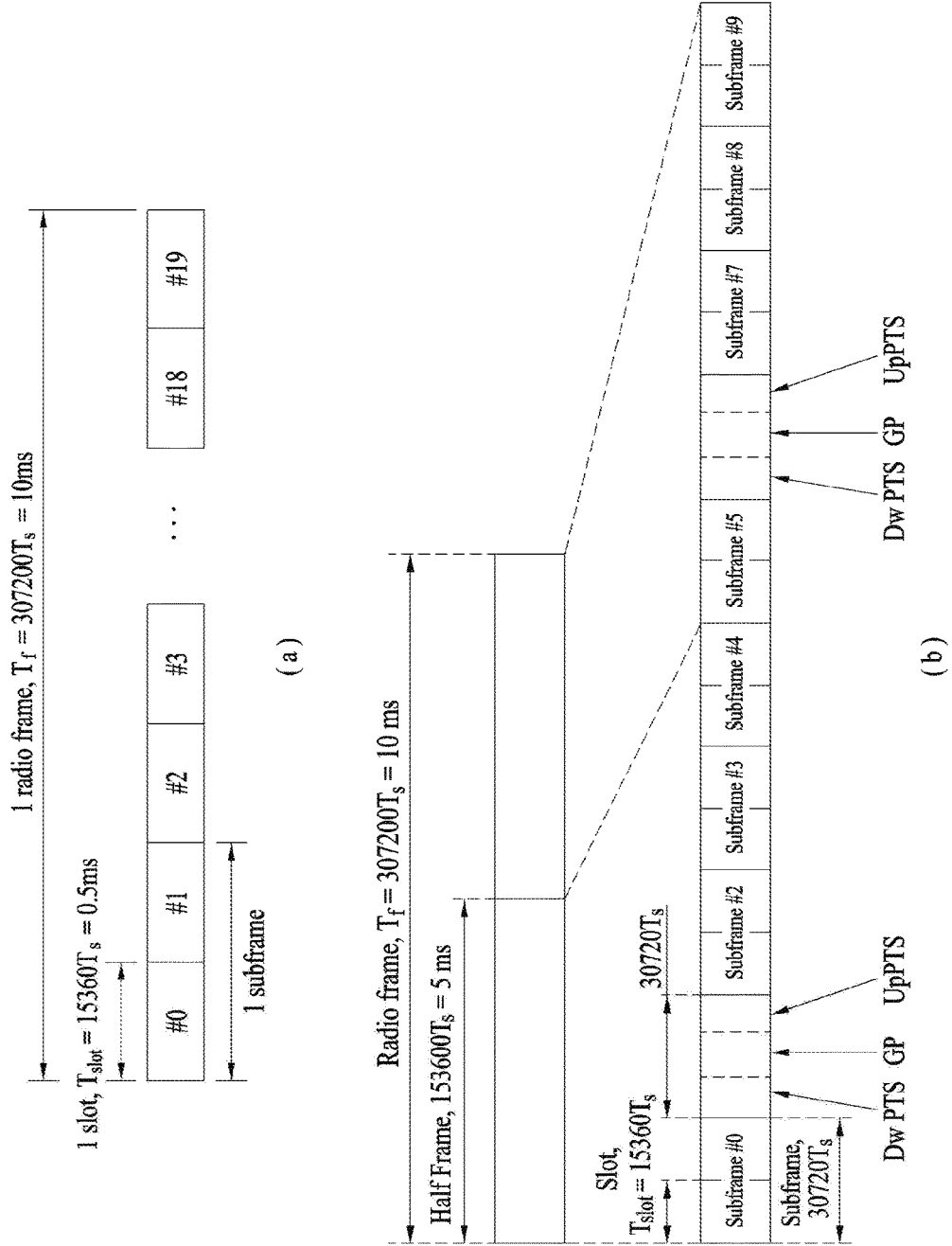
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | \multicolumn{10}{c}{Subframe number} |||||||||| 
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | | Normal cyclic prefix in downlink | | Extended cyclic prefix in downlink | | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
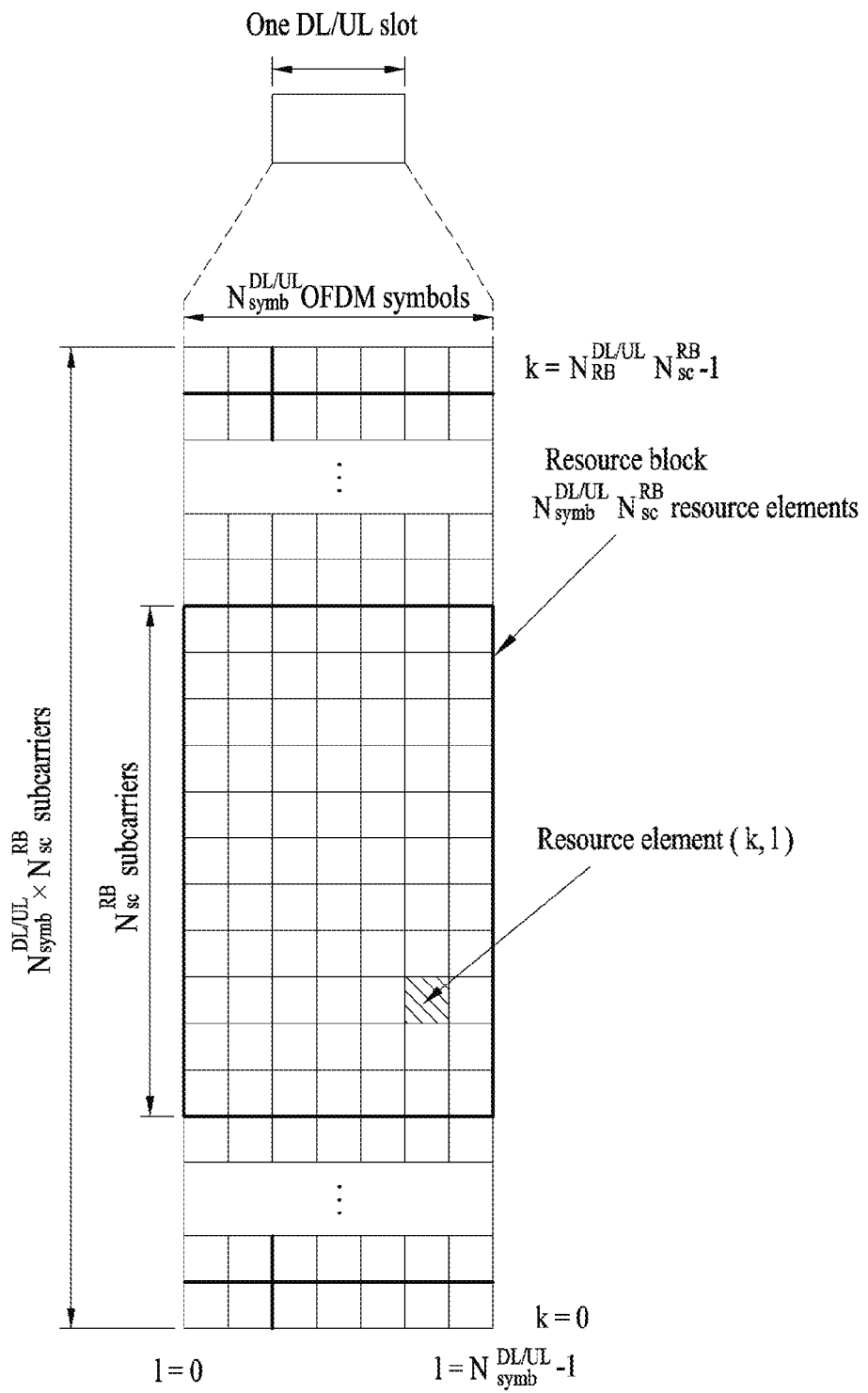
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}1-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

The relation between the PRB number $n_{PRB}$ in the frequency domain and resource elements (k, l) in a slot can be defined as follows.

$$n_{PRB} = \left\lfloor \frac{k}{N^{RB}_{sc}} \right\rfloor \quad \text{Equation 1}$$

In Equation 1, k denotes a subcarrier index, and $N^{RB}_{sc}$ denotes the number of subcarriers included in one RB.

A VRB is a type of logical resource allocation unit introduced for resource allocation. The VRB is equal in size to the PRB. The VRB is classified into a localized VRB (LVRB) and a distributed VRB (DVRB) according to a VRB-to-PRB mapping scheme. Regardless of VRB type, a pair of RBs is allocated over two slots of a subframe by a single VRB number $n_{VRB}$. LVRBs are directly mapped to PRBs so that VRB numbers (or VRB indexes) correspond equally to PRB numbers. That is, $n_{PRB}=n_{VRB}$. The LVRBs are numbered from 0 to $N^{DL}_{VRB}-1$ and $N^{DL}_{VRB}=N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Two PRBs, which are respectively located at two slots of the subframe and have the same VRB number, will be referred to as VRB pair. A PRB pair and a VRB pair may be referred to as a RB pair. The RB for a UE or UE group is allocated on the basis of the VRB. Basically, VRBs having the same VRB number are allocated to the same UE or UE group. Mapping of the localized VRB to the PRB is called localized mapping and mapping of the distributed VRB to the PRB is called distributed mapping. A mapping method of the VRB to the PRB will be described in more detail later on.

Figure 3:
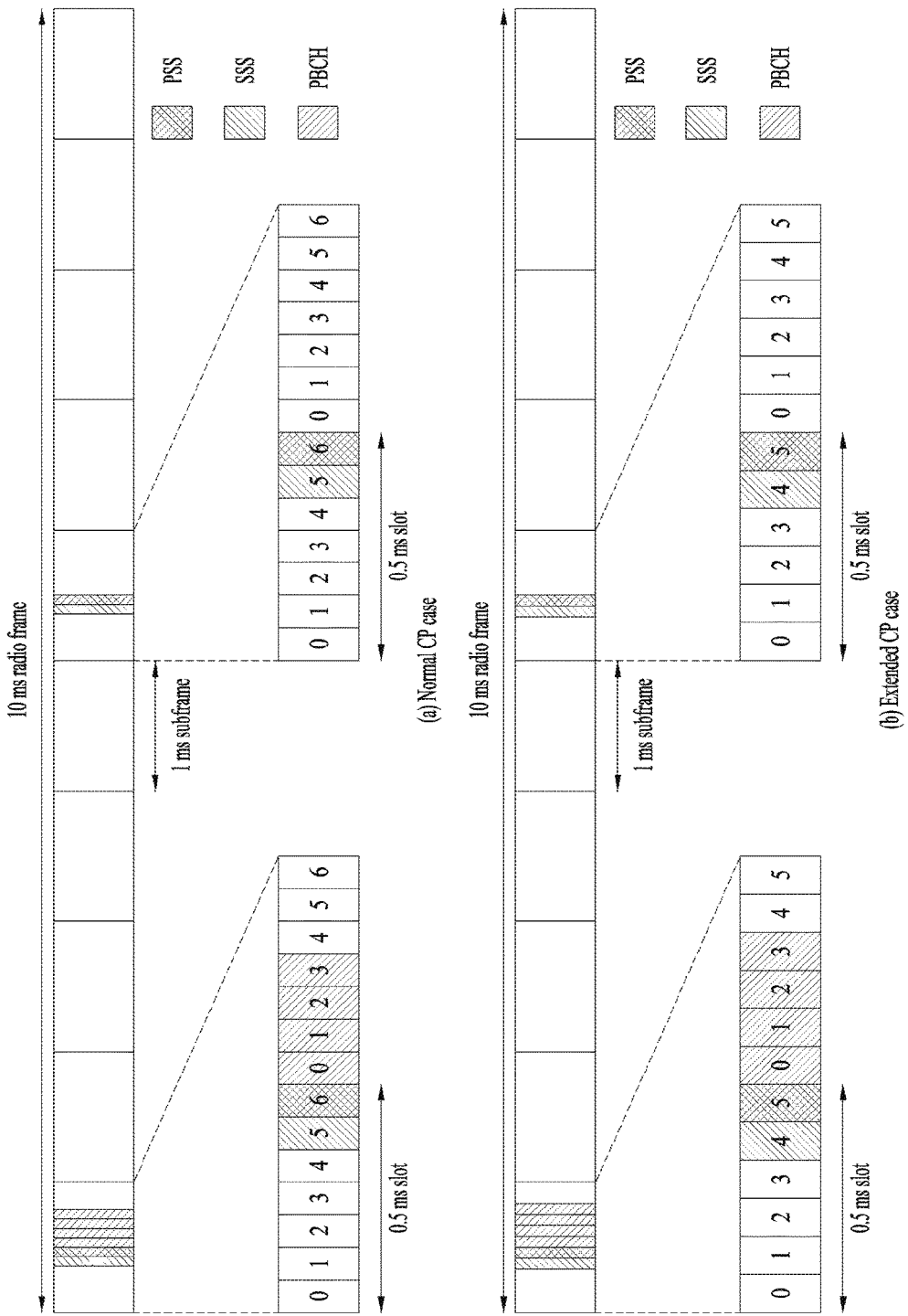
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Total 504 unique physical layer cell IDs can be represented by combinations of 3 PSSs and 168 SSSs. In other words, the physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N^{cell}_{ID}=3N^{(1)}_{ID}+N^{(2)}_{ID}$ is thus uniquely defined by a number $N^{(1)}_{ID}$ in the range of 0 to 167, representing the physical-layer cell-identity group, and a number $N^{(2)}_{ID}$ in the range of 0 to 2, representing the physical-layer identity within the physical-layer cell-identity group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS.

A sequence used for the SSS is an interleaved concatenation of two length-31 m-sequences of and the concatenated sequence is scrambled by a scrambling sequence given by a PSS. Here, an m-sequence is a type of a pseudo noise (PN) sequence.

If two m-sequences used for generating an SSS code are S1 and S2, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms can be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences can be transformed by high-speed m-sequence transform using fast Hadamard transform, if the m-sequences are used as the SSS, the amount of calculation necessary for a UE to interpret the SSS can be reduced. Since the SSS is configured by two short codes, the amount of calculation of the UE can be reduced.

Generation of the SSS will now be described in more detail. A sequence d(0), . . . , d(61) used for the SSS is an interleaved concatenation of two length-31 binary sequences. The concatenated sequence is scrambled by a sequence given by the PSS.

The PSS is mapped to 6 RBs (=72 subcarriers) near to a center frequency. Among the 72 subcarriers, 9 remaining subcarriers carry a value of always 0 and serve as elements facilitating filter design for performing synchronization.

A combination of two length-31 sequences for defining the PSS becomes different in subframe 0 and subframe 5 according to the following.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. After performing the aforementioned procedure, the UE may perform PDDCH/PDSCH reception and PUSCH/PUCCH transmission as general uplink/downlink transmission procedures.

Figure 4:
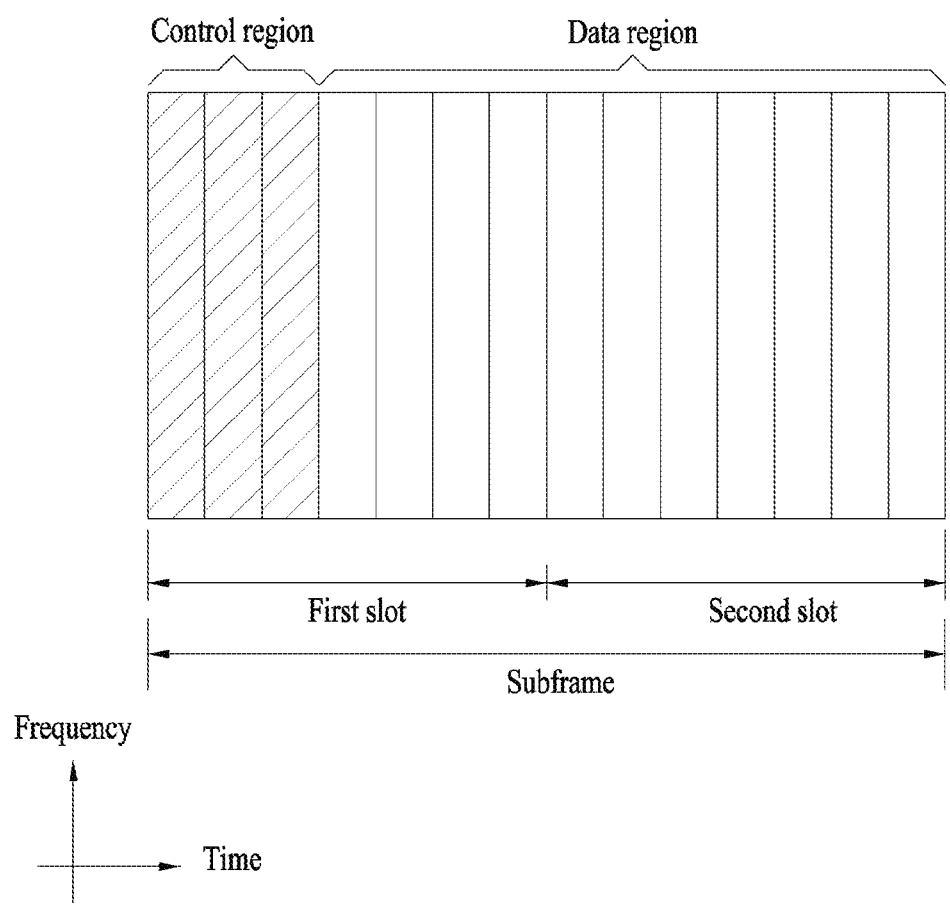
FIG. 4 illustrates the structure of a downlink (DL) subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table illustrates an example of the DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact resource assignments for PDSCH using rank-1 closed loop precoding |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

If RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH). The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107,108,109,110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH. Hereinafter, a PDCCH and an EPDCCH are simply referred to as PDCCHs except in cases specific to the EPDCCH. The present invention may be applied to an EPDCCH, a PUSCH, and a PDSCH and/or a PUSCH scheduled by the EPDCCH as well as to a PDCCH, a PUCCH, and a PDSCH and/or a PUSCH scheduled by the PDCCH.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

In order for the UE to demodulate or decode a DL signal, an RS signal is needed to estimate a channel between the UE and a node which has transmitted the DL signal. A CRS defined in an LTE system may be used for both demodulation and measurement.

A dedicated reference signal is known only to a specific RS and the CRS is known to all UEs. The CRS defined in the 3GPP LTE system may be regarded as a type of common RS. For reference, since demodulation is a part of a decoding process, the term demodulation is used interchangeably with the term decoding in the present invention.

Figure 5:
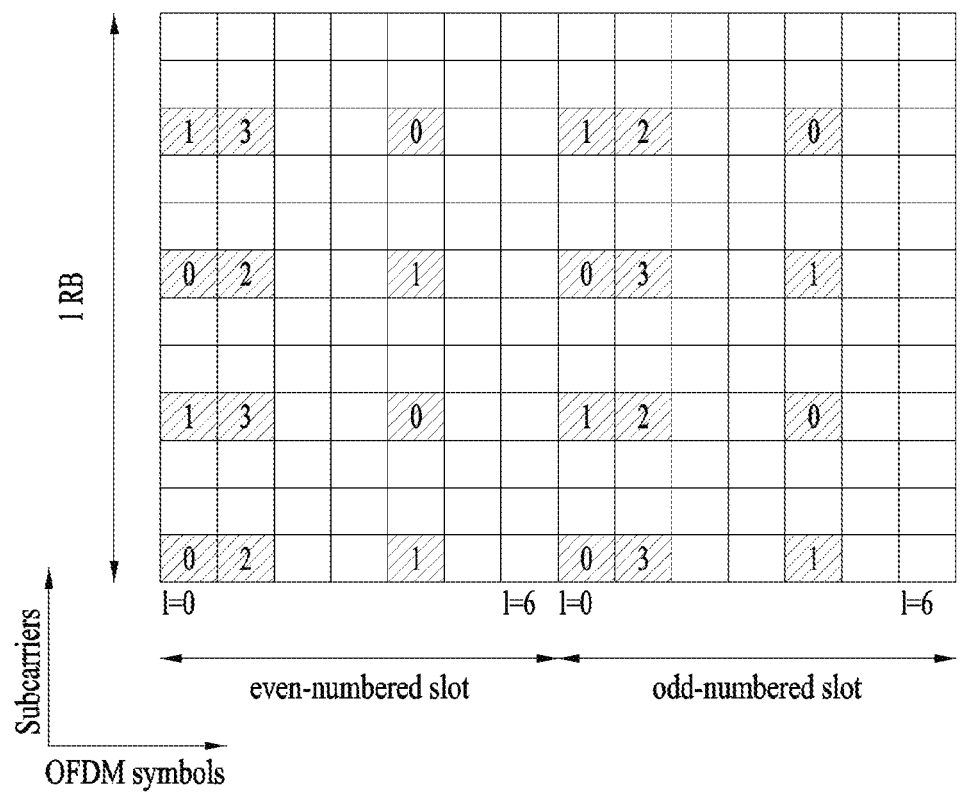
FIG. 5 illustrates configuration of cell specific reference signals (CRSs).

FIG. 5 illustrates configuration of cell specific reference signals (CRSs). Especially, FIG. 5 illustrates configuration of CRSs for a 3GPP LTE system supporting a maximum of four antennas.

In a legacy 3GPP system, since a CRS is used for both demodulation and measurement, the CRS is transmitted over an entire DL bandwidth in all DL subframes in a cell supporting PDSCH transmission and is transmitted over all antenna ports configured at an eNB.

More specifically, CRS sequence $r_{l,n_s}(m)$ is mapped to complex-valued modulation symbols $a_{k,l}^{(p)}$ used as reference symbols for antenna port p in slot $n_s$ according to the following equation.

$$a_{k,l}^{(p)} = r_{l,n_s}(m') \quad \text{Equation 2}$$

where $n_s$ is the slot number in a radio frame, and l is the OFDM symbol number within the slot, which is determined according to the following equation.

$$k = 6m + (v + v_{shift}) \bmod 6 \quad \text{Equation 3}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

where k denotes a subcarrier index, l denotes an OFDM symbol index, and $N_{RB}^{max,DL}$ denotes the largest DL bandwidth configuration, expressed as an integer multiple of $N_{sc}^{RB}$.

Parameters v and $v_{shift}$ define locations for different RSs in the frequency domain and v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{Equation 4}$$

The cell-specific frequency shift $v_{shift}$ is given by a physical layer cell identity $N_{ID}^{cell}$ as follows.

$$v_{shift} = N_{ID}^{cell} \bmod 6 \quad \text{Equation 5}$$

The CRS sequence $r_{l,n_s}(m)$ is defined by the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{Equation 6}$$

$$m = 0, 1, \ldots, 2N_{RB}^{max,DL} - 1$$

c(i) is a pseudo-random sequence defined by a length-31 Gold sequence. The output sequence c(n) of length $M_{PN}$, where n=0, 1, . . . , $M_{PN}$−1, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{Equation 7}$$

where $N_c$=1600 and the first m-sequence is initialized with $x_i(0)$=1, $x_i(n)$=0, n=1, 2, . . . , 30. The initialization of the second m-sequence is denoted by the following equation with the value depending on the application of the sequence.

$$c_{init} = \Sigma_{i=0}^{30} x_2(i) \cdot 2^i \quad \text{Equation 8}$$

The pseudo-random sequence generator for generating c(i) is initialized with $c_{init}$ at the start of each subframe according to the following equation.

$$C_{init} = 2^{10} \cdot (7 \cdot (n_s+1) + l+1) \cdot (2 \cdot N_{ID}^{cell}+1) + 2 \cdot N_{ID}^{cell} + N_{CP} \quad \text{Equation 9}$$

Herein, $n^{(nSCID)}_{ID}$ is a physical layer cell ID if the value of $n^{DMRS,i}_{ID}$ is not provided by a higher layer or DCI format 1A, 2B, or 2C is used for DCI associated with PDSCH transmission, and is $n^{DMRS,i}_{ID}$ otherwise.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Figure 6:
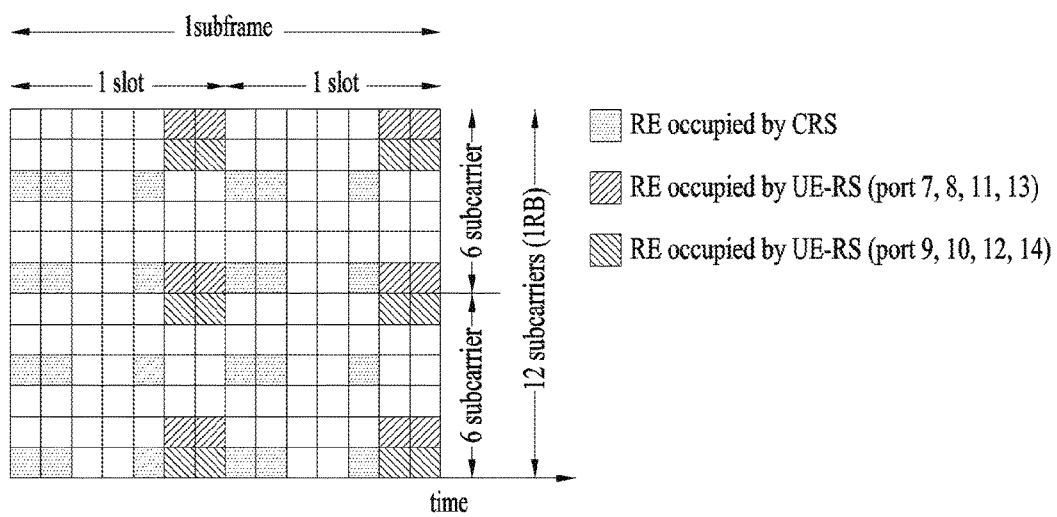
FIG. 6 illustrates UE-specific reference signals (UE-RSs).

FIG. 6 illustrates UE-specific reference signals (UE-RSs). In more detail, FIG. 6 illustrates REs occupied by UE-RSs among REs in one RB of a normal DL subframe with a normal CP.

UE-RSs are transmitted on antenna port(s) p=5, p=7, p=8 or p=7, 8, . . . , υ+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

Figure 7:
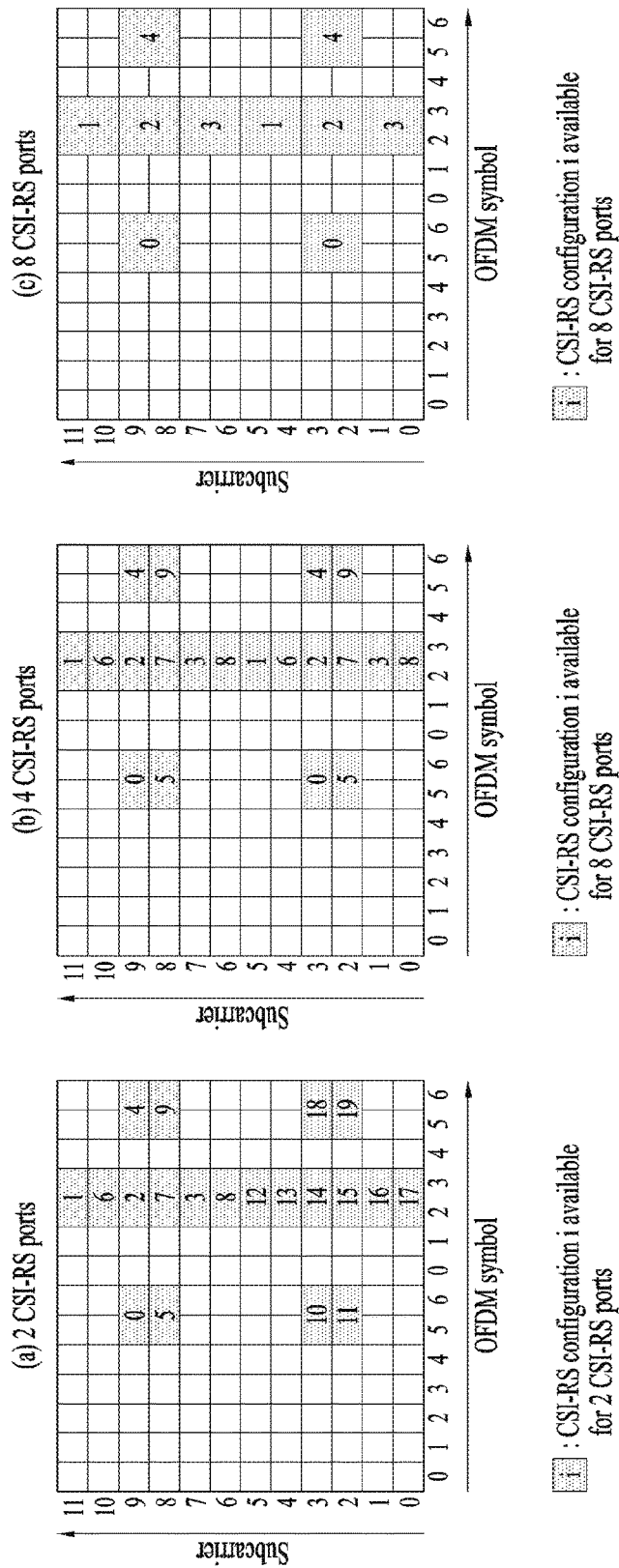
FIG. 7 illustrates channel state information reference signal (CSI-RS) configurations.

FIG. 7 illustrates channel state information reference signal (CSI-RS) configurations.

The CSI-RS is a DL RS introduced in the 3GPP LTE-A system, not for demodulation but for channel measurement. In the 3GPP LTE-A system, a plurality of CSI-RS configurations is defined for CSI-RS transmission.

FIG. 7(a) illustrates 20 CSI-RS configurations 0 to 19 available for CSI-RS transmission through two CSI-RS ports among the CSI-RS configurations, FIG. 7(b) illustrates 10 available CSI-RS configurations 0 to 9 through four CSI-RS ports among the CSI-RS configurations, and FIG. 7(c) illustrates 5 available CSI-RS configurations 0 to 4 through 8 CSI-RS ports among the CSI-RS configurations. The CSI-RS ports refer to antenna ports configured for CSI-RS transmission. For example, referring to Equation 25, antenna ports 15 to 22 correspond to the CSI-RS ports. Since CSI-RS configuration differs according to the number of CSI-RS ports, if the numbers of antenna ports configured for CSI-RS transmission differ, even the same CSI-RS configuration number corresponds to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair but also with subframes in which CSI-RSs are configured. That is, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number is assigned and a CSI-RS configuration varying according to a CSI-RS configuration number, the number of CSI-RS ports, and/or a CSI-RS configured subframe, the CSI-RS configuration of the latter will be referred to as a CSI-RS resource configuration.

In order to avoid interference to neighbor cell(s) on time-frequency resources on which the neighbor cell(s) transmits CSI-RSs or in order to measure interference caused by the neighbor cell(s) to a serving cell, the CSI-RS resource configuration may be used. For example, an eNB may inform a UE of time-frequency resources about which the UE should assume power to be zero transmission power by using the CSI-RS resource configuration. The time-frequency resources about which the UE should assume power to be zero transmission power are configured using 16 CSI-RS configurations for 4 CSI-RS ports. Upon receiving bit map information consisting of 16 bits which are mapped to the 16 CSI-RS configurations in one-to-one correspondence, the UE assumes power on REs corresponding to CSI-RS configuration(s) mapped to bit(s) set to 1 among the 16 bits to be zero transmission power. A CSI-RS that the UE assumes that a serving cell thereof transmits the CSI-RS at power other than zero transmission power may be referred to as a non-zero power (NZP) CSI-RS and a CSI-RS that the UE assumes that the serving cell thereof transmits the CSI-RS at zero power may be referred to as a zero power (ZP) CSI-RS.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc. CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table illustrates frame configuration $I_{CSI-RS}$ according to $T_{CSI-RS}$ and $\Delta_{CSI-RS}$.

TABLE 4

| CSI-RS SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying "$(10n_f+\text{floor}(n_s/2)-\Delta_{CSI-RS}) \mod T_{CSI-RS}=0$" are subframes including a CSI-RS. Here, $n_f$ denotes a radio frame number in a radio frame and $n_s$ denotes a slot number in a radio frame.

A UE configured as transmission mode defined after the 3GPP LTE-A system (e.g. transmission mode 9 or other newly defined transmission mode) may perform channel measurement using a CSI-RS and demodulate or decode a PDSCH using the UE-RS.

Figure 8:
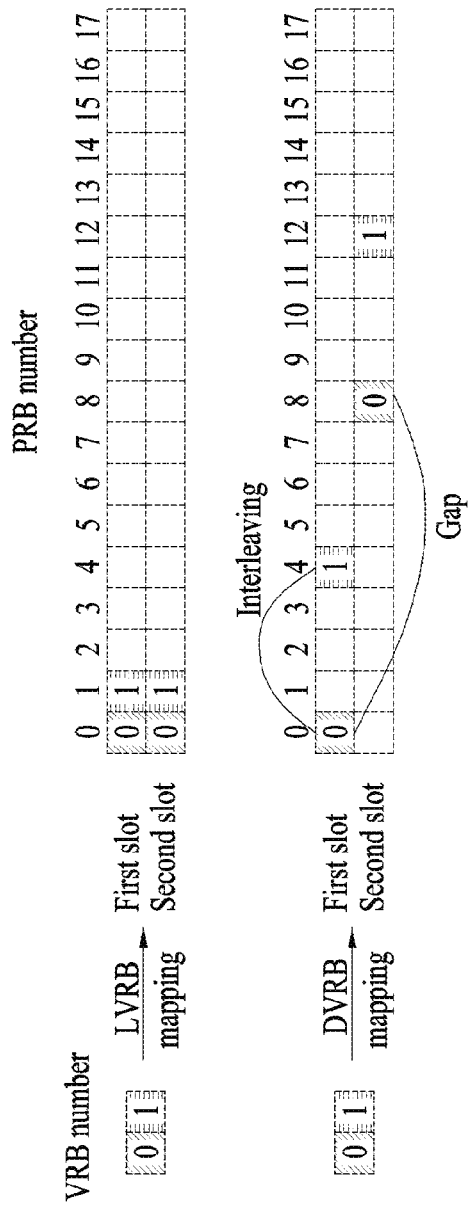
FIG. 8 illustrates a method of mapping a virtual resource block (VRB) to a physical resource block (PRB).

FIG. 8 illustrates a method of mapping a VRB to a PRB.

Referring to FIG. 8, LVRBs are directly mapped to PRBs so that VRB numbers (or VRB indexes) correspond equally to PRB numbers. That is, $n_{PRB}=n_{VRB}$. The LVRBs are numbered from 0 to $N^{DL}_{VRB}-1$ and $N^{DL}_{VRB}=N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Specifically, the DVRBs may be mapped to the PRBs as follows. The following table illustrates RB gap values.

TABLE 5

| System BW ($N^{DL}_{RB}$) | Gap ($N_{gap}$) | |
|---|---|---|
| | 1st Gap ($N_{gap,1}$) | 2nd Gap ($N_{gap,2}$) |
| 6-10 | ceil($N^{DL}_{RB}/2$) | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g. PRB unit) when VRBs of the same number are mapped to PRBs of the first and second slots. If $6 \leq N^{DL}_{RB} \leq 49$ only one gap is defined ($N_{gap}=N_{gap,1}$). If $50 \leq N^{DL}_{RB} \leq 110$, two gap values $N_{gap,1}$ and $N_{gap,2}$ are defined. $N_{gap}=N_{gap,1}$ or $N_{gap}=N_{gap,2}$ is signalled through DL scheduling. DVRBs are numbered from 0 to $N^{DL}_{VRB}-1$. For $N_{gap}=N_{gap,1}$, $N^{DL}_{VRB}=N^{DL}_{VRB,gap1}=2 \cdot \min(N_{gap}, N^{DL}_{RB}-N_{gap})$. For $N_{gap}=N_{gap,2}$, $N^{DL}_{VRB}=N^{DL}_{VRB,gap2}=\text{floor}(N^{DL}_{RB}/2 \cdot N_{gap}) \cdot 2 \cdot N_{gap}$. Here, min(A, B) indicates the smaller of A and B and floor(x) indicates the largest integer not greater than x.

Consecutive $\tilde{N}_{VRB}^{DL}$ VRB numbers constitute a unit for VRB number interleaving. If $N_{gap}=N_{gap,1}$, then $\tilde{N}_{VRB}^{DL}=N^{DL}_{VRB}$ and if $N_{gap}=N_{gap,2}$, then $\tilde{N}_{VRB}^{DL}=2N_{gap}$. VRB number interleaving of each interleaving unit may be performed using four columns and $N_{row}$ rows. $N_{row}=\{\text{ceil}(\tilde{N}_{VRB}^{DL}/(4P))\} \cdot P$ and P is the size of an RBG. Here, ceil denotes a ceiling function and ceil(x) is a minimum integer not smaller than x. An RBG is defined as P consecutive RBs. VRB numbers are written in a matrix on a row-by-row basis and are read on a column-by-column basis. $N_{null}$ null values are inserted into the last $N_{null}/2$ row of the second and fourth columns and $N_{null}=N_{row}-\tilde{N}_{VRB}^{DL}$. The null values are ignored upon reading.

Meanwhile, in a 3GPP LTE/LTE-A system, various resource allocation (RA) types (e.g. Type 0 RA, Type 1 RA, Type 2 RA, etc.) are defined. For Type 0 RA or Type 1 RA, DCI formats 1, 2, and 2A are used and, for Type 2 RA, DCI formats 1A, 1B, 1C, and 1D are used. In Type 0 RA, RB allocation information includes a bitmap indicating a resource block group (RBG) allocated to a UE. The RBG is a set of one or more continuous PRBs. The size of the RBG depends upon system bandwidth. In Type 1 RA, RB allocation information indicates resources in an RBG subset allocated to a scheduled UE in units of PRBs. In Type 2 RA, RB allocation information indicates a set of VRBs continuously allocated to the scheduled UE.

Figure 9:
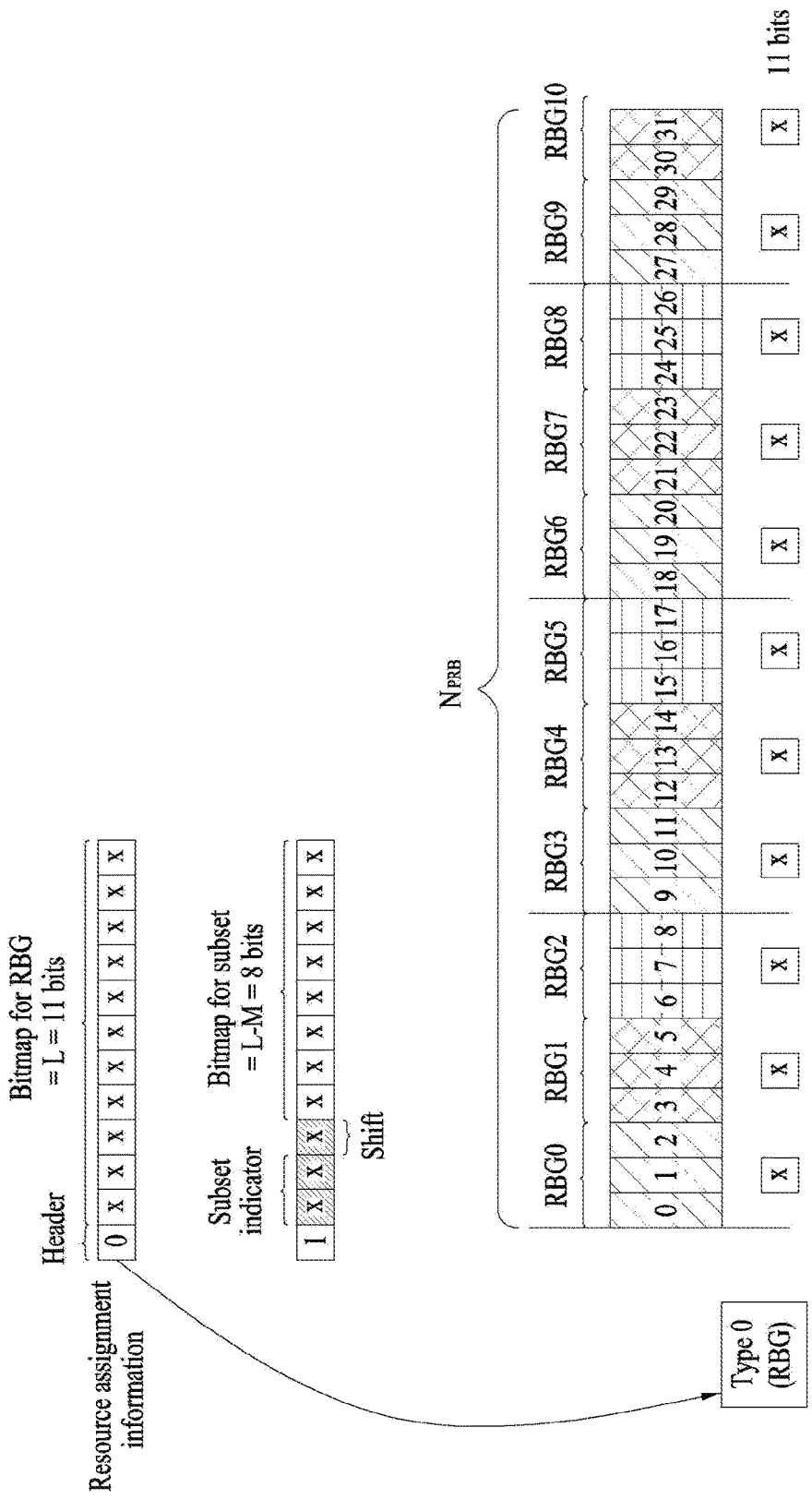
FIG. 9, FIG. 10 and FIG. 11 illustrate control information formats for Type 0 resource allocation (RA), Type 1 RA, and Type 2 RA and examples of resource allocation thereof, respectively.
Figure 10:
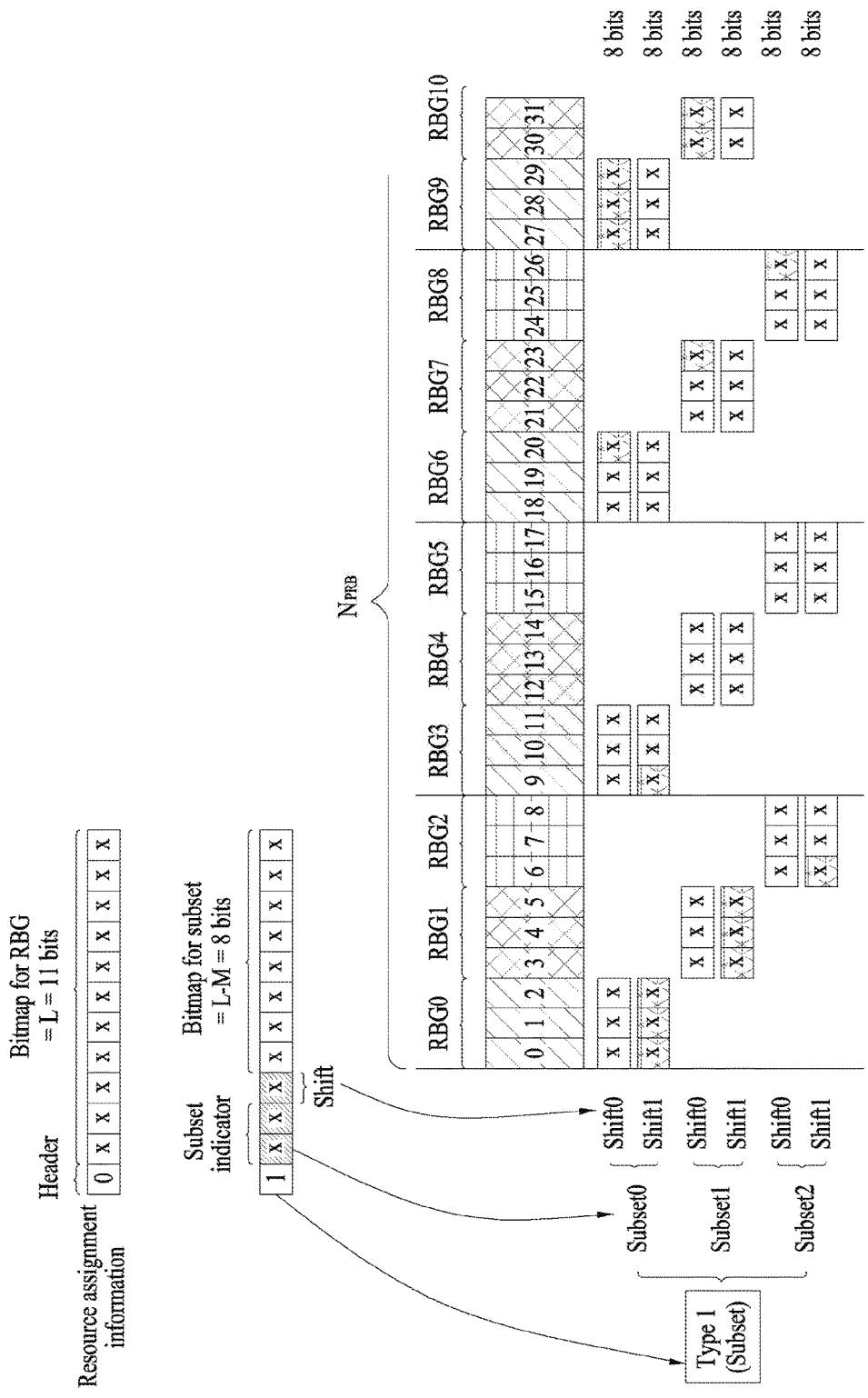
Figures 11, 12:
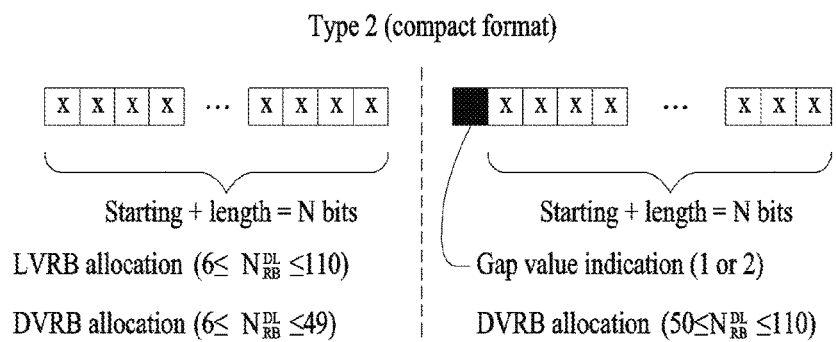
FIG. 12 illustrates a table used for start position and length determination in Type 2.

Hereinafter, resource allocation defined in legacy LTE will be described referring to FIG. 6 to FIG. 12. FIG. 9, FIG. 10 and FIG. 11 illustrate control information formats for Type 0 resource allocation (RA), Type 1 RA, and Type 2 RA and examples of resource allocation thereof, respectively. FIG. 12 illustrates a table used for start position and length determination in Type 2.

A UE interprets a resource allocation field based on a detected PDCCH DCI format. The resource allocation field in each PDCCH includes two parts: a resource allocation header field and actual RB assignment information. PDCCH DCI formats 1, 2, and 2A for Type 0 and Type 1 RA have the same format and are distinguished by a single-bit resource allocation header field which is present according to DL system bandwidth. Specifically, Type 0 RA is indicated by 0 and Type 1 RA is indicated by 1. While PDCCH DCI formats 1, 2, and 2A are used for Type 0 or Type 1 RA, PDCCH formats 1A, 1B, 1C, and 1D are used for Type 2 RA. A PDCCH DCI format having Type 2 RA does not include a resource allocation header field. The resource allocation field indicates a PRB set of the first slot. Since slot hopping does not exist between the first slot and the second slot in the case of RA Type 0, Type 1, and Type 2-LVRB, which will be described later, the same PRB set as in the first slot is allocated in the second slot (i.e. PRB index (of the first slot)=PRB index (of the second slot)). Meanwhile, in the case of RA Type 2-DVRB, if the PRB set of the first slot is given, the PRB set of the second slot is determined by a slot hopping rule.

Referring to FIG. 9, in Type 0 RA, RB assignment information includes a bitmap indicating an RBG allocated to a UE. The RBG is a set of consecutive PRBs. The size of the RBG, P, depends upon system bandwidth as follows.

TABLE 6

| System Bandwidth $N^{DL}_{RB}$ | RBG Size (P) |
|---|---|
| ≤10 | 1 |
| 11-26 | 2 |
| 27-63 | 3 |
| 64-110 | 4 |

In DL system bandwidth having $N^{DL}_{RB}$ PRBs, a total number of RBGs, $N_{RBG}$, is given by $N_{RBG}=\text{ceil}(N^{DL}_{RB}/P)$, the size of floor($N^{DL}_{RB}/P$) RBGs is P, and the size of one RBG is $N^{DL}_{RB}-P \cdot \text{floor}(N^{DL}_{RB}/P)$ when $N^{DL}_{RB}$ mod P>0. Here, mod indicates a modulo operation. The size of a bitmap is $N_{RBG}$ and each bit corresponds to one RBG. All RBGs are indexed 0 to $N_{RBG}-1$ in a frequency increase direction and RBG 0 to RBG $N_{RBG}-1$ are mapped from a most significant bit (MSB) to a least significant bit (LSB) of the bitmap. The RBG is allocated to the UE if the corresponding bit value in the bitmap is 1, the RBG is not allocated to the UE otherwise.

Referring to FIG. 10, in Type 1 RA, RB assignment information having the size of $N_{RBG}$ informs a scheduled UE of resources in an RBG subset in PRB units. An RBG subset p (0≤p<P) consists of every P-th RBG starting from an RBG p. The RB assignment information includes three fields. The first field has ceil{$\log_2(P)$} bits and indicates an RBG subset selected from among P RBG subsets. The second field has one bit and indicates shift of a resource assignment span within a subset. The shift is triggered when a bit value is 1 and is not triggered when a bit value is not 1. The third field includes a bitmap and each bit indicates one PRB within a selected RBG set. The size of a bitmap part used to indicate a PRB within the selected RBG subset is $N^{TYPE1}_{RB}$ and is defined as follows.

$$N_{RB}^{TYPE1}=\lceil N_{RB}^{DL}/P \rceil - \lceil \log_2(P) \rceil -1 \qquad \text{Equation 10}$$

An addressable PRB number in a selected RBG subset may start from an offset $\Delta_{shift}(p)$ from the smallest PRB number within the selected RBG subset and may be mapped to the MSB of a bitmap. The offset is expressed by the number of PRBs and is applied within the selected RBG subset. When the bit value within the second field for shift of the resource assignment span is set to 0, an offset for an RBG subset p is given as $\Delta_{shift}(p)=0$. In the other cases, the offset for the RBG subset p is given as $\Delta_{shift}(p)=N^{RBGsubset}_{RB}(p)-N^{TYPE1}_{RB}$. $N^{RBGsubset}_{RB}(p)$ denotes the number of PRBs within the RBG subset p and may be obtained as follows.

$$N^{RBGsubset}_{RB}(p) = \quad\quad\quad\text{Equation 11}$$

$$\begin{cases} \left\lfloor \frac{N^{DL}_{RB}-1}{P^2} \right\rfloor \cdot P + P, & p < \left\lfloor \frac{N^{DL}_{RB}-1}{P} \right\rfloor \mod P \\ \left\lfloor \frac{N^{DL}_{RB}-1}{P^2} \right\rfloor \cdot P + (N^{DL}_{RB}-1)\mod P + 1, & p + \left\lfloor \frac{N^{DL}_{RB}-1}{P} \right\rfloor \mod P \\ \left\lfloor \frac{N^{DL}_{RB}-1}{P^2} \right\rfloor \cdot P, & p > \left\lfloor \frac{N^{DL}_{RB}-1}{P} \right\rfloor \mod P \end{cases}$$

Consequently, when RBG subset p is indicated, bit i for i=0, 1, . . . , $N^{TYPE1}_{RB}-1$ in the bitmap field indicates a following VRB number.

$$n^{RBGsubset}_{VRB}(p) = \quad\quad\quad\text{Equation 12}$$

$$\left\lfloor \frac{i+\Delta_{shift}(p)}{P} \right\rfloor P^2 + p \cdot P + (i+\Delta_{shift}(p))\mod P$$

Referring to FIG. 11, in Type 2 RA, RB assignment information indicates a set of LVRBs or DVRBs consecutively allocated to a scheduled UE. If resource assignment is signaled in PDCCH DCI format 1A, 1B, or 1D, a 1-bit flag indicates whether an LVRB or DVRB is allocated (e.g. 0 denotes LVRB assignment and 1 denotes DVRB assignment). In contrast, if resource assignment is signaled in PDCCH DCI format 1C, only a DVRB is always allocated. A Type 2 RA field includes a resource indication value (RIV) and the RIV corresponds to a start RB $RB_{start}$ and length. The length denotes the number of virtually and consecutively allocated RBs.

For example, referring to FIG. 12, RIV=47 means that a total of four RBs are allocated starting from an RB of which VRB index is 2.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transmission block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Transport format information in DCI regarding a PDSCH may be determined using predefined tables. For example, if a DCI CRC is scrambled by a P-RNTI, an RA-RNTI, or an SI-RNTI, a UE may use a modulation order $Q_m$ of 2 and, if not, the UE may use a modulation and coding scheme field $I_{MCS}$ in the DCI and the following table to determine the modulation order $Q_m$ used for the PDSCH. The following table shows a transport block size (TBS) index for the PDSCH.

TABLE 7

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

The UE determines the size of a transport block included in the PDSCH based on $I_{TBS}$ and/or information indicating a column of a TBS table included in the DCI. The following table illustrates a part of the TBS table, particularly, for transport blocks not mapped to spatial multiplexing of 2 layers or more.

TABLE 8

| | $N_{PRB}$ | | | | | | | | | |
| --- | --- | --- | --- | --- | --- | --- | --- | --- | --- | --- |
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |

TABLE 8-continued

| | | | | | | | | | | |
|---|---|---|---|---|---|---|---|---|---|---|
| 2 | 32 | 72 | 144 | 176 | 208 | 256 | 296 | 328 | 376 | 424 |
| ... | ... | ... | ... | ... | ... | ... | ... | ... | ... | ... |
| 26 | 712 | 1480 | 2216 | 2984 | 3752 | 4392 | 5160 | 5992 | 6712 | 7480 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 0 | 288 | 328 | 344 | 376 | 392 | 424 | 456 | 488 | 504 | 536 |
| ... | ... | ... | ... | ... | ... | ... | ... | ... | ... | ... |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| ... | ... | ... | ... | ... | ... | ... | ... | ... | ... | ... |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| ... | ... | ... | ... | ... | ... | ... | ... | ... | ... | ... |
| 26 | 75376 | 75376 | 75376 | 75376 | 75376 | 75376 | 75376 | 75376 | 75376 | 75376 |

In addition to the above table, various TBS tables may be defined according to a mapping relationship between transport blocks and layers (refer to Section 7.1.7.2.1 to Section 7.1.7.2.5 of 3GPP TS 36.213 V11.4.0).

Figure 13:
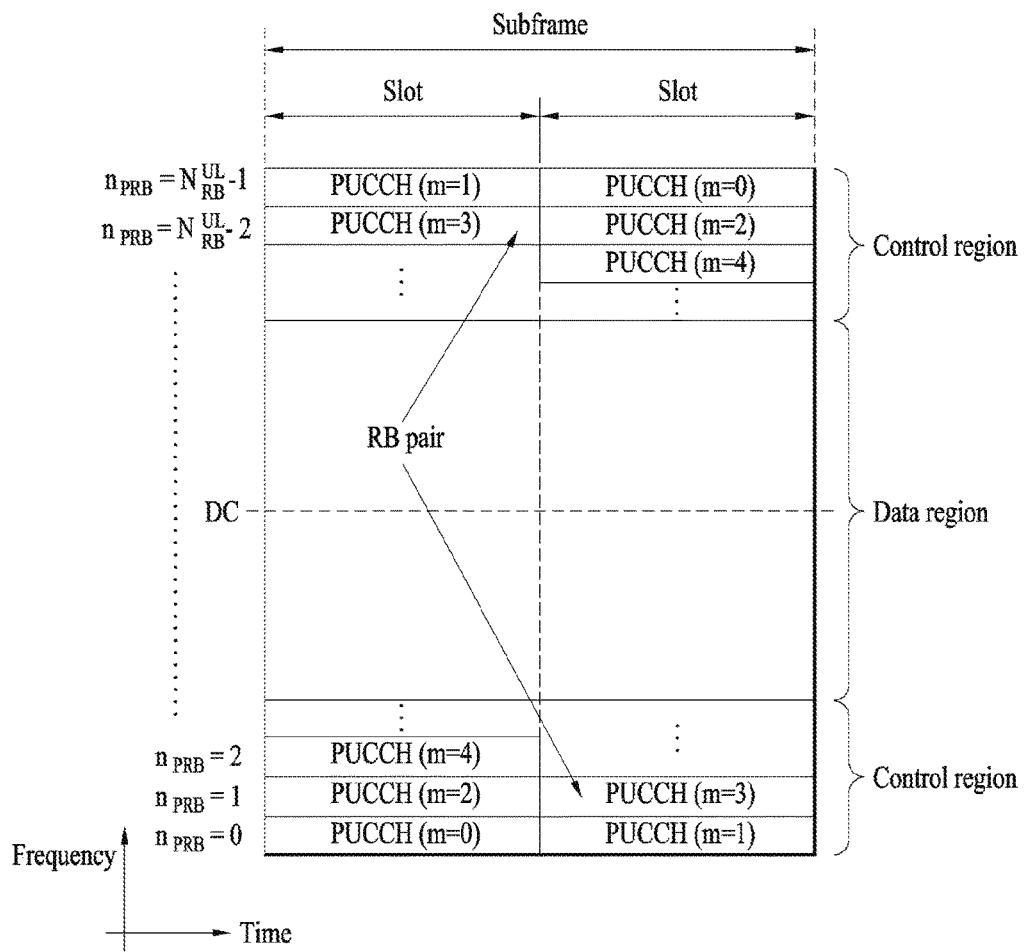
FIG. 13 illustrates the structure of a uplink (UL) subframe used in a wireless communication system.

FIG. 13 illustrates the structure of a UL subframe used in a wireless communication system.

Referring to FIG. 13, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

The following table shows a CQI table used for 4-bit CQI transmission.

TABLE 9

| CQI index | modulation | code rate * 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The UE may calculate a CQI value using channel measurement derived based on a CRS and using the CQI table and report the CQI value to the eNB. Alternatively, the UE may calculate the CQI value using channel measurement derived based on an NZP CSI-RS configured for channel measurement (and interference measurement derived based on a ZP CSI-RS configured for interference measurement in association with the NZP CSI-RS) and using the CQI table and report the CQI value to the eNB. The eNB may be aware of a channel state that the UE desires to report using the received CQI value and the CQI table.

FIG. 14 is a diagram for explaining single-carrier communication and multi-carrier communication. Specially, FIG. 14(a) illustrates a subframe structure of a single carrier and FIG. 14(b) illustrates a subframe structure of multiple carriers.

Referring to FIG. 14(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 14(b), three 20 MHz CCs in each of UL and DL are aggregated to support a BW of 60 MHz. The CCs may be contiguous or non-contiguous in the frequency domain Although FIG. 14(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 15:
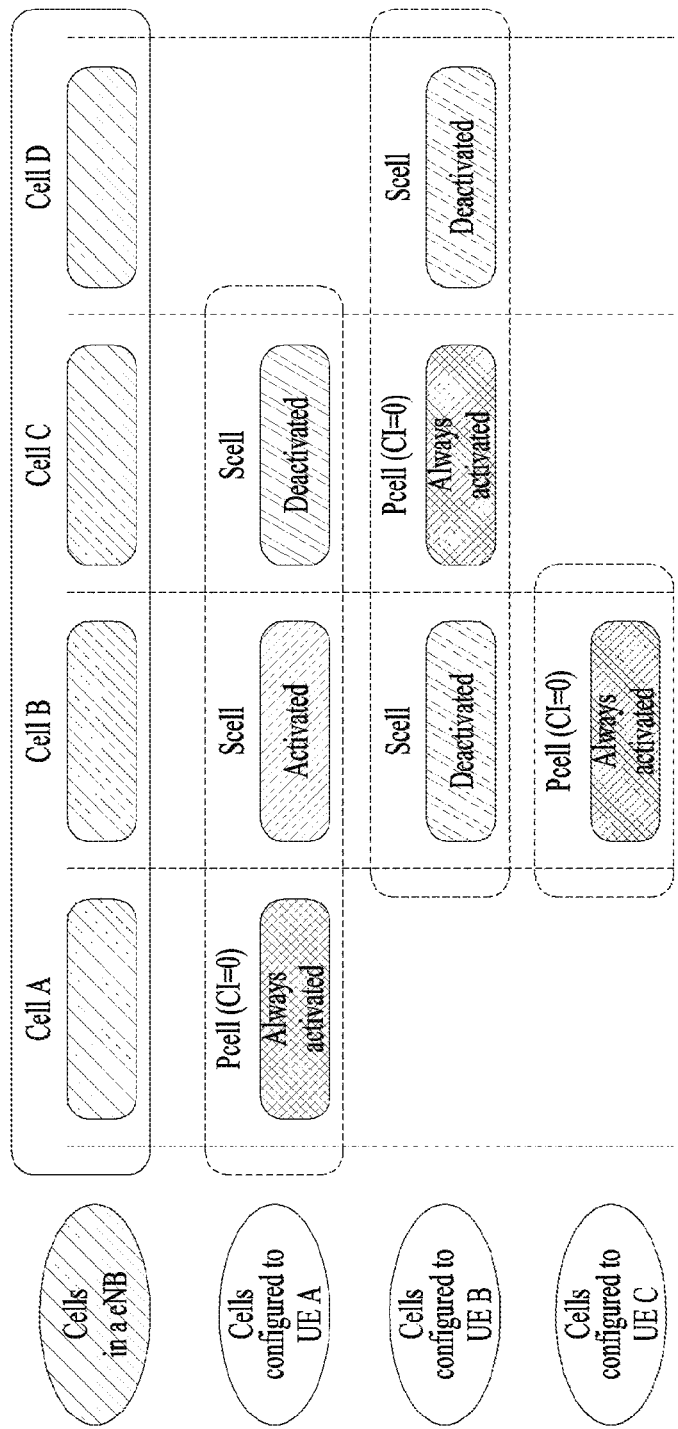
FIG. 15 illustrates the state of cells in a system supporting the carrier aggregation (CA).

FIG. 15 illustrates the state of cells in a system supporting CA.

In FIG. 15, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, prereserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 15, CI denotes a serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group. The cell mentioned in the present invention means a cell of carrier aggregation which is combination of UL CC and DL CC unless specifically noted.

In legacy systems subject to communication with one node, the UE-RS, CSI-RS, and CRS are transmitted at the same location, and therefore the UE does not consider a situation in which delay spread, Doppler spread, frequency shift, average received power, and received timing differ among the UE-RS port(s), CSI-RS port(s) and CRS port(s0. However, for a communication system to which coordinated Multi-Point (CoMP) communication technology allowing more than one node to simultaneously participate in communication with the UE is applied, the properties may differ among the PDCCH port(s), PDSCH port(s), UE-RS port(s), CSI-RS port(s) and/or CRS port(s). For this reason, the concept of a "quasi co-located antenna port" is introduced for a mode (hereinafter, CoMP mode) in which multiple nodes can participate in communication.

With respect to antenna ports, the term "Quasi co-located (QCL)" or "quasi co-location (QCL)" can be defined as follows: if two antenna ports are QCL, the UE may assume that the large-scale properties of a signal received through one of the two antenna ports can be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports can be inferred from the large-scale properties of a channel for conveying a symbol on the other antenna port. The large-scale properties include delay spread, Doppler spread, Doppler shift, average gain and/or average delay.

One of the two definitions of QCL given above may be applied to the embodiments of the present invention. Alternatively, the definition of QCL may be modified to assume that antenna ports for which QCL assumption is established are co-located. For example, QCL may be defined in a manner that the UE assumes that the antenna ports for which QCL assumption is established are antenna ports of the same transmission point.

For non-quasi co-located (NQC) antenna ports, the UE cannot assume the same large-scale properties between the antenna ports. In this case, a typical UE needs to perform independent processing for each NQC antenna with respect to timing acquisition and tracking, frequency offset estimation and compensation, and delay estimation and Doppler estimation.

On the other hand, for antenna ports for which QCL assumption can be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used for channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/EPDCCH, the UE performs data demodulation after performing channel estimation of the PDSCH through a configured DMRS sequence. If the UE can make an assumption that a DMRS port configuration received through the DL scheduling grant and a port for a specific RS (e.g., a specific CSI-RS, a specific CRS, a DL serving cell CRS of the UE, etc.) port are QCL, then the UE may apply the estimate(s) of the large-scale properties estimated through the specific RS port to channel estimation through the DMRS port, thereby improving processing performance of the DMRS-based receiver.

FIG. 16 illustrates the concept of a small cell.

In CA for existing systems, when a plurality of CCs is aggregated and used, data transmission and acquisition of a cell ID, transmission of system information, and transmission of a physical control signal are allowed, and thus there exists a PCC capable of accessing a stand-alone CC and transmitting/receiving a control signal and data. When an SCC which is capable of transmitting/receiving data only when CCs are aggregated with the PCC is configured, it is assumed that UL/DL frame time synchronization with the SCC is consistent with time synchronization of the PCC on the assumption that that CCs not far apart from each other in the frequency domain are aggregated. Further, the existing LTE/LTE-A system considers only a situation in which the aggregated CCs are used by one node, center frequencies neighbors each other, and thus the frequency properties are similar to each other.

However, the CCs configured for the UE may be used by multiple nodes spaced more than a certain distance from each other, and the center frequencies may be spaced apart from each other by an interval greater than a certain level. Accordingly, frequency aggregation of inter-frequencies having different frequency properties may also be considered. When different nodes participate in CA using different CCs or the same CC, namely when different cells participate in CA using the same CC or different CCs, the aggregated CC(s) may be connected by an ideal backhaul or a non-ideal backhaul. The ideal backhaul refers to a backhaul having a very high throughput and a very low delay such as a dedicated point-to-point connection by means of an optical fiber or an LOS (line of sight) microwave. On the other hand, the non-ideal backhaul refers to a typical backhaul such as xDSL (digital subscriber line) and NLOS (non line of sight) microwave which are commercially widely used. With the ideal backhaul, it may be presumed that there is no delay in exchanging information between cells or nodes.

Meanwhile, introduction of a small cell whose size, namely the coverage of the node or CC is smaller than that of the existing cell is under consideration. An existing cell having a wider coverage than the small cell is called a macro cell. The small cell provides services in coverage narrower than the service coverage of the existing cell due to properties thereof including power and frequency. Since the small cell, which uses a node of low power, can be readily disposed at indoor and outdoor hotspots, it is useful when communication traffic soars. Herein, the node of low power generally refers to a node having transmit power lower than the transmit powers of a macro node and a typical eNB. For example, a pico eNB and a femto eNB may be used as low power nodes. When a UE with low mobility requires high throughput, efficiency of data transmission may be increased if the UE uses the small cell.

The small cell may be used as a PCC of a specific UE, or used only as the SCC. Multiple small cells may be established to form a cluster, or multiple small cells and a macro cell may be established together. A small cell cluster formed by a set of multiple small cells may be present within the coverage of the macro cell as shown in FIG. 16(a), or may be independently present out of the coverage of the macro cell as shown in FIG. 16(b).

In a scenario of dense small cells, a UE may be connected to an overlaid macro cell and the small cells may have the possibility of being used for data offloading. In this case, the UE may discover as many cells as possible within a communication range. Then, it is preferable that the overlaid macro layer choose a best cell in consideration of "loading" information as well as other information. That is, the best cell for data offloading may not be a best cell selected based on reference signal received power (RSRP) and/or reference signal received quality (RSRQ). Rather, a cell having low loading or many users may be desirable as the best cell in terms of overall cell management. Therefore, an advanced discovery procedure is considered to detect more cells than cells detected according to a conventional mechanism.

Hereinafter, a reference signal used for the advanced discovery procedure will be referred to as a discovery reference signal (DRS).

The DRS may have the following characteristics. That is, the DRS:

(1) detects more cells than cells detected based on a legacy PSS/SSS/CRS;

(2) detects cells within a short time as in a subframe;

(3) performs measurement within a short time as in a subframe; and (4) supports measurement necessary for a fast time scale on/off operation.

The present invention considers a few candidates that can be considered for an advanced discovery algorithm as follows.

(a) The DRS is a PSS/SSS/CSI-RS/CRS or a configurable PSS/SSS/CRS;

(b) The DRS is a PSS/SSS/CRS;

(c) The DRS is a PSS/SSS/CSI-RS;

(d) The DRS is a PSS/SSS/CSI-RS/CRS or a configurable PSS/SSS/CSI-RS.

While the present invention considers the DRS configured in the above four types, embodiments of the present invention may be applied even when the DRS is configured in types other than the above types.

It is expected that the DRS will have to be used for coarse time/frequency tracking, measurement, and (if necessary) QCL. When taking into consideration some objectives, the DRS needs to satisfy the following requirements:

(1) The DRS should support coarse time synchronization with an assumption of a significantly great initial timing error (such as ±2.5 ms);

(2) The DRS should support coarse frequency synchronization with an assumption of a significantly great initial frequency error (such as 20 kHz);

(3) The DRS should support detectability of at least three cells (or transmission points);

(4) The DRS should support sufficient measurement accuracy.

To support the requirements of (1) and/or (2), it may be assumed that a PSS and/or an SSS can be transmitted.

For easy configuration, periodicity of DRSs may be considered together with the following constraints:

(1) A multiple of a measurement gap period, for example, 40 ms, 80 ms, 160 ms, or 320 ms (if a new measurement gap period is configured, multiples of such a new period may also be considered);

(2) Alignment with a DRX cycle, for example, 10, 20, 32, 40, 64, 80, 128, 160, 256, 320, 512, 640, 1024, 1280, 2048, or 2560 (This constraint may be eliminated if the UE can perform measurement for a serving cell using legacy signals);

(3) If a PSS/SSS is transmitted in the DRS, the periodicity of the DRS may be a multiple of 5 ms so that the PSS/SSS transmitted for the DRS may be replaced by a PSS/SSS transmitted in an on-state. If the DRS is not transmitted in an on-state, this constraint may be eliminated. Alternatively, in order to avoid the impact on a legacy UE, another periodicity which is not aligned with a PSS/SSS may be considered such that the PSS/SSS may be transmitted in an on-state while an additional PSS/SSS may also be transmitted for DRS transmission. Hereinafter, a PSS and an SSS transmitted as a DRS will be referred to as a DRS-PSS and a DRS-SSS, respectively. If the DRS-PSS and the DRS-SSS are additionally transmitted separately from the PSS/SSS transmitted in an on-state, a cell ID of the DRS-PSS/DRS-SSS may be different from a cell ID of the PSS/SSS.

In the present invention, a DRS-PSS, a DRS-SSS, a DRS-CRS, a DRS-CSI-RS, and a DRS-PRS represent a PSS, an SSS, a CRS, a CSI-RS, and a PRS constituting a DRS, respectively.

If a DRS that a specific cell will transmit in the long term is transmitted in the above-described types of (a) to (d), sequences and resources of a DRS-PSS, a DRS-SSS, a DRS-CRS, and a DRS-CSI-RS may be configured as similarly as possible to a legacy PSS, SSS, CRS, and CSI-RS but the DRS-PSS, the DRS-SSS, the DRS-CRS, and the DRS-CSI-RS may be transmitted with different scrambling initialization parameter(s) and/or different resource locations (e.g. different frequency/time resources) from the legacy PSS, SSS, CRS, and CSI-RS. More characteristically, the DRS-CSI-RS may use a resource pattern of the legacy CSI-RS but use a transmission subframe and period or a scrambling ID different from that of the legacy CSI-RS. That is, a scrambling ID, the number of antenna ports, and a transmission period/offset of a DRS-CSI-RS that a specific cell transmits may be different from those of a CSI-RS that the specific cell transmits.

Figure 17:
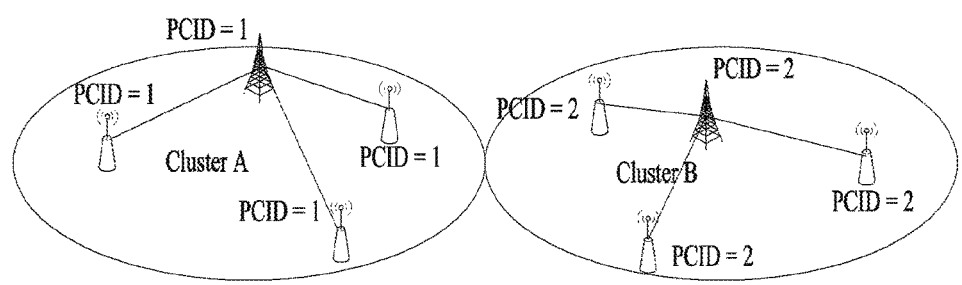
FIG. 17 illustrates a shared cell-ID.

FIG. 17 illustrates a shared cell-ID.

Referring to FIG. 17, a "shared cell-ID scenario" indicates a scenario in which multiple transmission points (TPs) in a specific (small cell) cluster/group transmit signals with the same physical cell-ID (hereinafter, PCID). Herein, the PCID may indicate a cell-specific ID used to transmit a PSS/SSS and a CRS as in current LTE technology or an additional cluster ID used commonly in a specific cluster. Unique ID information may be assigned to each TP in order to obtain additional cell-splitting gain between a plurality of TPs in the cluster. Hereinafter, a unique ID number assigned to each TP will be referred to as a TPID. Each TPID may be used as a sequence scrambling initialization parameter (e.g. scramblingIdentity) of one of a CSI-RS and a DRS that a corresponding TP transmits and may also be used for other TP-specific RS transmissions.

According to an embodiment of the present invention, a situation in which each TP transmits a unique TP-specific DRS is considered. A DRS may consist of multiple RSs and it is not assumed that each TP transmits all of the multiple RSs constituting the DRS. For example, assuming that the DRS consists of a DRS-PSS/DRS-SSS/DRS-CSI-RS/DRS-CRS, the DRS-PSS/DRS-SSS/DRS-CRS may be transmitted by each TP or may be transmitted by representative TPs.

One role that UEs perform through a DRS is RSRP/RSRQ measurement. In a legacy system, a UE performs RSRP and/or RSRQ measurement through a CRS. However, in a small cell that transmits the DRS, RSRP and/or RSRQ measurement through the DRS is considered. In this case, since the CRS and the DRS may include different sequences, RE positions, and RE densities, the values of RSRP and RSRQ measured from the two RSs in the same cell may differ. In the present invention, the values of RSRP and RSRQ measured from the CRS as in the legacy system are referred to as a C-RSRP and a C-RSRQ, respectively, and the values of RSRP and RSRQ measured from the DRS as opposed to the legacy system are referred to as a D-RSRP and a D-RSRQ, respectively, for convenience.

A UE may receive a DRS measurement timing configuration (hereinafter, DMTC), which is timing information for DRS measurement, from an eNB. The DMTC may include a period and an offset value and may further include a duration value.

If a DRS including a CSI-RS is transmitted, i.e. if a DRS-CSI-RS is transmitted, a specific cell may configure resources on which DRS-CSI-RSs of neighbor cells are transmitted as zero-power CSI-RS (hereinafter, ZP CSI-RS) resources and use the ZP CSI-RS resources to measure the amount of interference from the neighbor cells. In this case, when a PDSCH is transmitted, rate-matching may be performed in an RE region configured as a ZP CSI-RS. The ZP CSI-RS region may be a resource region configured only in a subframe region in which a DRS is transmitted or in a subframe region (e.g. DMTC) in which DRS based measurement is performed and may be a region configured separately from a legacy ZP CSI-RS resource.

In a small cell environment in which cells are densely present, resources configured as ZP CSI-RSs may occupy many parts due to a large number of neighbor cells. Then, it may be undesirable to use a TBS of a large value conventionally used.

When a DRS is transmitted in the small cell environment, the DRS may consist of a PSS/SSS, a CRS, and a CSI-RS and the CSI-RS positions of neighbor cells may be configured as ZP CSI-RS resources. If the CRS is transmitted through one port (e.g. port 0), resources excluding resources on which the DRS (PSS/SSS, port-0 CRS, and CSI-RS) are transmitted from a specific PRB region consisting of 168 REs defined by 14 OFDM symbols and 12 subcarriers correspond to 134 REs (=168 REs−(24 REs (for the PSS/SSS)+8 REs (for the CRS)+2 REs (for the CSI-RS)). If a ZP CSI-RS resource region that can be maximally used is excluded, 104 (=134-30) REs remain for FDD and 92 (=134-42) REs remains for TDD. This means that resources of about 40% of an original number of RE resources cannot be used for PDSCH transmission. In this case, if a PDCCH and a DMRS of 2 OFDM symbols are also transmitted, 72 REs are used for PDSCH transmission for FDD and only 60 REs are used for PDSCH transmission for TDD. This means that resources of about 60% of an original number of RE resources cannot be used for PDSCH transmission.

In this way, when a large amount of resources cannot be used for PDSCH transmission, if a TBS applied to a legacy normal DL subframe is used without change, since the amount of resources capable of actually transmitting a PDSCH is too small relative to the TBS, problems may occur, for example, the PDSCH should be transmitted at too high a code rate or the PDSCH is transmitted at a code rate of a value more than 1 according to MCS level.

Accordingly, the present invention proposes using a transport block (TB) of a small size compared with a legacy TB when a large amount of ZP CSI-RS resources is configured in a subframe in which a DRS is transmitted in a small cell environment.

While a description will be given under the assumption that the present invention is applied when a large amount of ZP CSI-RS resources is configured in a subframe in which the DRS is transmitted, the description of the present invention may be identically applied even when a large amount of ZP CSI-RS resources is configured in a normal subframe in which the DRS is not transmitted. In addition, the description of the present invention may be identically applied even to all normal cells (a macro cell, a pico cell, or a femto cell) other than a small cell.

In a subframe in which the DRS is not transmitted, a CSI-RS (or an NZP CSI-RS) described in the present invention represents an NZP CSI-RS (for feedback). On the other hand, in a subframe in which the DRS is transmitted, the CSI-RS (or NZP CSI-RS) may represent a DRS-CSI-RS transmitted in the DRS or include both the DRS-CSI-RS and the NZP CSI-RS (for feedback).

Section A. Application Criteria of a Reduced TBS

In a small cell environment, when a ZP CSI-RS resource is configured in a subframe in which a DRS is transmitted or in a normal subframe in which the DRS is not transmitted, a smaller TBS than a TBS obtained from a TBS table (e.g. Table 8) may be used in a corresponding subframe by the same method as in a conventionally used scheme. In this case, criteria for applying a smaller TBS than a legacy TBS may be as follows.

Criterion 1-1.

Only in a subframe in which the DRS is transmitted (or in a DMTC subframe), if the amount of resources configured as ZP CSI-RSs per RB is larger than X REs or Y or more ZP CSI-RS (resource) configurations are configured, the UE may assume that a smaller TBS than a legacy TBS is applied for PDSCH transmission in the corresponding subframe.

Criterion 1-2.

Only in a subframe in which the DRS is transmitted (or in a DMTC subframe), if the total amount of resources configured as NZP CSI-RSs or ZP CSI-RSs per RB is larger than X REs or Y or more NZP SCI-RS or ZP CSI-RS (resource) configurations are configured, the UE may assume that a smaller TBS than a legacy TBS is applied for PDSCH transmission in the corresponding subframe.

Criterion 2-1

In a subframe in which the DRS is transmitted (or in a DMTC subframe), the UE may assume that a smaller TBS than a legacy TBS is applied for PDSCH transmission.

Criterion 3-1

In a specific subframe, if the amount of resources configured as ZP CSI-RSs per RB is larger than X REs or Y or more ZP CSI-RS (resource) configurations are configured, the UE may the UE may assume that a smaller TBS than a legacy TBS is applied for PDSCH transmission in the corresponding subframe.

Criterion 3-2

In a specific subframe, if the amount of resources configured as NZP CSI-RSs or ZP CSI-RSs per RB is larger than X REs or Y or more ZP CSI-RS (resource) configurations are configured, the UE may assume that a smaller TBS than a legacy TBS is applied for PDSCH transmission in the corresponding subframe.

Criterion 4-1

In a subframe in which the DRS is transmitted, the UE may assume that a smaller TBS than a legacy TBS is applied for PDSCH transmission in the corresponding subframe.

Criterion 4-2

In a subframe configured as a DMTC, the UE may assume that a smaller TBS than a legacy TBS is applied for PDSCH transmission in the corresponding subframe.

Criterion 5-1

In a DRS occasion duration (or DMTC duration), if the total amount of resources configured as NZP CSI-RSs and/or ZP CSI-RSs is larger than X REs and an MCS index having a modulation order of 6 or more is configured, the UE may assume that a smaller TBS than a legacy TBS is applied.

Criterion 5-2

In a specific subframe, if NZP CSI-RSs and/or ZP CSI-RSs are configured and an MCS index having a modulation order of 6 or more is configured, the UE may assume that a smaller TBS than a legacy TBS is applied.

Section B. TBS Reduction Method

When resources on which a PDSCH can be transmitted satisfy the above-described criteria mentioned in Section A, a reduced TBS may be applied. To obtain the reduced TBS, the following methods may be applied. Even when the criteria mentioned in Section A are not satisfied, a TBS reduction/restriction scheme proposed below may be applied.

Method 1

According to an embodiment of Method 1 regarding TBS reduction/restriction, a value obtained by multiplying a predetermined value less than 1 by a TBS value obtained from a TBS table (e.g. Table 8 or TBS tables of 3GPP TS 36.213 V11.4.0) using the same method as a conventionally used scheme may be determined as a reduced TBS. For example, if the reduced TBS is $N_{TB}$ and the TBS obtained from the TBS table (e.g. Table 8) using the same method as the conventionally used scheme is $N_{TB}'$, then $N_{TB}$, which is an actually applied reduced TBS, may be defined as follows.

$N_{TB}=\max\{\text{floor}(N_{TB}'\times\alpha),1\}$      Option 1.

$N_{TB}=\text{floor}(N_{TB}'\times\alpha)$      Option 2.

$N_{TB}=\text{ceil}(N_{TB}'\times\alpha)$      Option 3.

Herein, $\alpha$ may be a value less than 1 or may be a positive real number less than 1.

For example, when a normal CP is used, $\alpha$ may be determined by the ratio of the number of RE resources excluding resources used as DRSs and/or ZP CSI-RSs from 144 REs to the 144 REs which are the number of remaining RE resources per RB when a PDCCH is configured with two OFDM symbols. In this case, if a DRS consists of a PSS/SSS, a CRS, and a CSI-RS, the number of RE resources excluding resources used as the DRSs from the 144 REs is 114. In addition, the number of RE resources excluding resources used as the ZP CSI-RSs from the 144 REs is 104 in an FDD environment and 92 in a TDD environment. The number of RE resources excluding both resources used as the DRSs and resources used as the ZP CSI-RSs from the 144 REs is 82 in the FDD environment and is 70 in the TDD environment.

Therefore, when a normal CP is used in the FDD environment, the value of $\alpha$ may generally be 82/144 (=about 0.57) upon considering the resources used as the DRSs and the ZP CSI-RSs.

Alternatively, when the normal CP is used in the FDD environment, the value of $\alpha$ may generally be 104/144 (=about 0.72) upon considering only the resource used as the ZP CSI-RSs (or the NZP CSI-RSs and the ZP CSI-RSs). In this case, it is proposed that the value of a, i.e. 104/144 (about 0.72), approximate to 0.75. This value of $\alpha$ may be equally applied even to the TDD environment or an extended CP environment.

Alternatively, $\alpha$ may be varied/determined according to the number of configured ZP CSI-RSs (or the number of REs used as the ZP CSI-RSs). For example, when the normal CP is used in the FDD environment, the value of $\alpha$ may be set to $(144-N_{ZP\text{-}CSI\text{-}RS\ RE})/144$ (or floor$\{(144-N_{ZP\text{-}CSI\text{-}RS\ RE})/144\}$ or ceil$\{(144-N_{ZP\text{-}CSI\text{-}RS\ RE})/144\}$) upon considering only the resources used as the ZP CSI-RSs. In this case, $N_{ZR\text{-}CSI\text{-}RS\ RE}$ denotes the number of REs, per RB, used as the ZP CSI-RSs. In addition, $\alpha$ may be varied/determined according to the number of configured ZP CSI-RSs and the number of NZP CSI-RSs (or the number of REs used as the ZP CSI-RSs or the NZP CSI-RSs).

Method 2

According to an embodiment of Method 2 regarding TBS reduction/restriction, fewer PRBs than the number of PRBs in which a PDSCH is actually transmitted may be used in order to obtain a TBS from the TBS table (e.g. Table 8 or TBS tables of 3GPP TS 36.213 V11.4.0) for the purpose of TBS reduction. For example, when a parameter corresponding to the number of PRBs applied to obtain the TBS from the TBS table is $N_{PRB}$ and the number of PRBs allocated for actual PDSCH transmission is $N_{PRB}'$, then $N_{PRB}$ may be defined as follows.

$N_{PRB}=\max\{\text{floor}(N_{PRB}'\times\alpha),1\}$      Option 1.

$N_{PRB}=\text{floor}(N_{PRB}'\times\alpha)$      Option 2.

$N_{PRB}=\text{ceil}(N_{PRB}'\times\alpha)$      Option 3.

That is, in order to acquire a reduced TBS, the UE may calculate the value of $N_{PRB}$ from $N_{PRB}'$, which is the number of PRBs allocated for PDSCH transmission, using the above equation and obtain the TBS from the TBS table (e.g. Table 8) using the values of $N_{PRB}$ and $I_{TBS}$.

In the above options, $\alpha$ may be a value less than 1 or may be a positive real number less than 1.

For example, when a normal CP is used, $\alpha$ may be determined by the ratio of the number of RE resources excluding resources used as DRSs and/or ZP CSI-RSs from 144 REs to the 144 REs which are the number of remaining RE resources per RB when a PDCCH is configured with two OFDM symbols. In this case, if a DRS consists of a PSS/SSS, a CRS, and a CSI-RS, the number of RE resources excluding resources used as the DRSs from the 144 REs is 112. In addition, the number of RE resources excluding resources used as the ZP CSI-RSs from the 144 REs is 104 in an FDD environment and 92 in a TDD environment. The number of RE resources excluding both resources used as the DRSs and resources used as the ZP CSI-RSs from the 144 REs is 82 in the FDD environment and is 70 in the TDD environment.

Therefore, when a normal CP is used in the FDD environment, the value of $\alpha$ may generally be 82/144 (=about 0.57) upon considering the resources used as the DRSs and the ZP CSI-RSs.

Alternatively, when the normal CP is used in the FDD environment, the value of $\alpha$ may generally be 104/144 (=about 0.72) upon considering only the resource used as the ZP CSI-RSs (or the NZP CSI-RSs and the ZP CSI-RSs). In this case, it is proposed that the value of a, i.e. 104/144 (about 0.72), approximate to 0.75. This value of $\alpha$ may be equally applied even to the TDD environment or an extended CP environment.

Alternatively, $\alpha$ may be varied/determined according to the number of configured ZP CSI-RSs (or the number of REs used as the ZP CSI-RSs). For example, when the normal CP is used in the FDD environment, the value of $\alpha$ may be set to $(144-N_{ZP\text{-}CSI\text{-}RS\ RE})/144$ (or floor$\{(144-N_{ZP\text{-}CSI\text{-}RS\ RE})/144\}$ or ceil$\{(144-N_{ZP\text{-}CSI\text{-}RS\ RE})/144\}$) upon considering only the resources used as the ZP CSI-RSs. In this case, $N_{ZP\text{-}CSI\text{-}RS\ RE}$ denotes the number of REs, per RB, used as the ZP CSI-RSs. In addition, $\alpha$ may be varied/determined according to the number of configured ZP CSI-RSs and the number of NZP CSI-RSs (or the number of REs used as the ZP CSI-RSs or the NZP CSI-RSs).

Method 3

According to an embodiment of Method 3 regarding TBS reduction/restriction, a TBS value obtained from the TBS table (e.g. Table 8 or TBS tables of 3GPP TS 36.213 V11.4.0) is used without change using the same method as a conventionally used scheme for the purpose of TBS reduction but a maximum value of $I_{MCS}$, a maximum value of $I_{TBS}$, and/or a maximum value of $N_{PRB}$ that can be used may be restricted.

In this case, a maximum value of $I_{MCS}$, a maximum value of $I_{TBS}$, and/or a maximum value of $N_{PRB}$ that can be configured for the UE may be restricted. Therefore, the UE may assume that a maximum value of $I_{MCS}$, a maximum value of $I_{TBS}$, and/or a maximum value of $N_{PRB}$ having larger values than a maximum value of $I_{MCS}$, a maximum value of $I_{TBS}$, and/or a maximum value of $N_{PRB}$ in a corresponding subframe are not configured therefor. If values larger than the maximum value of $I_{MCS}$, the maximum value of $I_{TBS}$, and/or the maximum value of $N_{PRB}$ are configured, the UE may interpret the values as the maximum value of $I_{MCS}$, the maximum value of $I_{TBS}$, and/or the maximum value of $N_{PRB}$ and then apply the values. Characteristically, the maximum value of $I_{MCS}$ may be 21.

If the maximum value of $N_{PRB}$ that can be configured for the UE is restricted, the maximum value of $N_{PRB}$ may have a different value according to the size of an RB in which a PDSCH is transmitted.

The value of a modulation order $Q_m$ that can be configured for the UE may be restricted. For example, the modulation order $Q_m$ that can be configured for the UE cannot exceed 6. That is, the UE may assume that the modulation order $Q_m$ of 6 or more is not configured therefor. In this case, if the modulation order of 6 or more is configured, the UE may assume that the maximum value of $I_{MCS}$ among values of $I_{MCS}$ having a modulation order of 4 is the value of $I_{MCS}$ thereof. Alternatively, if the modulation order of 6 or more is configured, the UE may determine that a corresponding PDCCH is not available and may not attempt to receive a PDSCH. The UE may drop transmission of the PDCCH/PDSCH. For example, in a subframe in which a DRS is transmitted, the UE may assume that the modulation order $Q_m$ of 6 or more is not configured for PDSCH transmission in the corresponding subframe. Alternatively, in a subframe configured as a DMTC, the UE may assume that the modulation order $Q_m$ of 6 or more is not configured for PDSCH transmission in the corresponding subframe.

As another method, for reduction of the TBS, a TBS value obtained from the TBS table (e.g. Table 8 or TBS tables of 3GPP TS 36.213 V11.4.0) using the same method as a conventionally used scheme may be used but the value of a used MCS index may be restricted. Assuming that a 3-symbol PDCCH and a 2-port CRS are used, 120 REs per RB may be used for PDSCH transmission. In this case, the number of bits of data transmitted on one RB differs according to each MCS index. The number of bits of data transmitted on one RB with respect to each MCS is shown in the fifth column of Table 10.

TABLE 10

| MCS index $I_{MCS}$ | Modulation order $Q_m$ | TBS index $I_{TBS}$ | Target r*1024 | Number of bits of data per 120 REs | Number of bits of PDSCH | |
|---|---|---|---|---|---|---|
| | | | | | 80 REs for PDSCH | 64 REs for PDSCH |
| 0 | 2 | 0 | 120 | 28.125 | 160 | 128 |
| 1 | 2 | 1 | 157 | 36.796875 | 160 | 128 |
| 2 | 2 | 2 | 193 | 45.234375 | 160 | 128 |
| 3 | 2 | 3 | 251 | 58.828125 | 160 | 128 |

TABLE 10-continued

| MCS index $I_{MCS}$ | Modulation order $Q_m$ | TBS index $I_{TBS}$ | Target r*1024 | Number of bits of data per 120 REs | Number of bits of PDSCH | |
|---|---|---|---|---|---|---|
| | | | | | 80 REs for PDSCH | 64 REs for PDSCH |
| 4 | 2 | 4 | 308 | 72.1875 | 160 | 128 |
| 5 | 2 | 5 | 379 | 88.828125 | 160 | 128 |
| 6 | 2 | 6 | 449 | 105.234375 | 160 | 128 |
| 7 | 2 | 7 | 526 | 123.28125 | 160 | 128 |
| 8 | 2 | 8 | 602 | 141.09375 | 160 | 128 |
| 9 | 2 | 9 | 679 | 159.140625 | 160 | 128 |
| 10 | 4 | 9 | 340 | 159.375 | 320 | 256 |
| 11 | 4 | 10 | 378 | 177.1875 | 320 | 256 |
| 12 | 4 | 11 | 434 | 203.4375 | 320 | 256 |
| 13 | 4 | 12 | 490 | 229.6875 | 320 | 256 |
| 14 | 4 | 13 | 553 | 259.21875 | 320 | 256 |
| 15 | 4 | 14 | 616 | 288.75 | 320 | 256 |
| 16 | 4 | 15 | 658 | 308.4375 | 320 | 256 |
| 17 | 6 | 15 | 438 | 307.96875 | 480 | 384 |
| 18 | 6 | 16 | 466 | 327.65625 | 480 | 384 |
| 19 | 6 | 17 | 517 | 363.515625 | 480 | 384 |
| 20 | 6 | 18 | 567 | 398.671875 | 480 | 384 |
| 21 | 6 | 19 | 616 | 433.125 | 480 | 384 |
| 22 | 6 | 20 | 666 | 468.28125 | 480 | 384 |
| 23 | 6 | 21 | 719 | 505.546875 | 480 | 384 |
| 24 | 6 | 22 | 772 | 542.8125 | 480 | 384 |
| 25 | 6 | 23 | 822 | 577.96875 | 480 | 384 |
| 26 | 6 | 24 | 873 | 613.828125 | 480 | 384 |
| 27 | 6 | 25 | 910 | 639.84375 | 480 | 384 |
| 28 | 6 | 26 | 948 | 666.5625 | 480 | 384 |

In Table 10, r denotes a code rate. Referring to Table 10, if the number of REs that can be used for PDSCH transmission is, for example, 80, in consideration of resources used for a ZP-CSI-RS etc., the number of bits of a PDSCH that can be transmitted through one RB is shown in the sixth column of Table 10. If an MCS index is 22 to 28, the number of bits of data transmitted in a corresponding MCS index is greater than the number of bits of the PDSCH that can be transmitted. Therefore, it is desirable not to use the MCS indexes of 22 to 28. An embodiment of the present invention proposes that the UE assume that the MCS indexes of 22 to 28 are not used for reduction of the TBS. Characteristically, if the MCS indexes of 22 to 28 are configured for the UE, it is proposed that the MCS index be assumed to be 21. Alternatively, an embodiment of the present invention proposes that an eNB not configure the MCS indexes of 22 to 28 for the UE. As another example, when the number of REs that can be used for PDSCH transmission is, for example, 64, in consideration of resources used for a DRS, an NZP-CSI-RS, and/or a ZP-CSI-RS, the number of bits of the PDSCH that can be transmitted through one RB is as indicated in the seventh column of Table 10. If the MCS index is one of 8, 9, 14, 15, 16, and 20 to 28, the number of bits of data transmitted in a corresponding MCS index is greater than the number of bits of the PDSCH that can be transmitted. Accordingly, it is desirable not to use the MCS indexes of 8, 9, 14, 15, 16, and 20 to 28. The present invention proposes that the UE assume that the MCS indexes of 8, 9, 14, 15, 16, and 20 to 28 are not used for reduction of the TBS. If the MCS indexes of 8, 9, 14, 15, 16, and 20 to 28 are configured for the UE, it is proposed that the UE assume that the largest MCS index among MCS indexes smaller than the configured MCS indexes, rather than the MCS indexes of 8, 9, 14, 15, 16, and 20 to 28, is an MCS index thereof. Alternatively, an embodiment of the present invention proposes that an eNB not configure the MCS indexes of 8, 9, 14, 15, 16, and 20 to 28 for the UE.

Method 4

According to an embodiment of Method 3 regarding TBS reduction/restriction, the TBS table (e.g. Table 8 or TBS tables of 3GPP TS 36.213 V11.4.0) is used without change for the purpose of TBS reduction but a new MCS table is used so that a TBS of a large value is not used.

The new MCS table may be generated under the assumption that the number of REs that can be used for PDSCH transmission is, for example, 80, in consideration of resources used for a ZP-CSI-RS etc. Table 11 shows an MCS table which is generated so as not to exceed a code rate of 0.66 under the assumption that 80 REs can be used for PDSCH transmission.

TABLE 11

| MCS index $I_{MCS}$ | Modulation order $Q_m$ | TBS index $I_{TBS}$ | Number of bits of data per 120 REs | Code rate r |
|---|---|---|---|---|
| 0 | 2 | 0 | 28.125 | 0.1757813 |
| 1 | 2 | 1 | 36.796875 | 0.2299805 |
| 2 | 2 | 2 | 45.234375 | 0.2827148 |
| 3 | 2 | 3 | 58.828125 | 0.3676758 |
| 4 | 2 | 4 | 72.1875 | 0.4511719 |
| 5 | 2 | 5 | 88.828125 | 0.5551758 |
| 6 | 2 | 6 | 105.234375 | 0.6577148 |
| 7 | 4 | 6 | 105.46875 | 0.3295898 |
| 8 | 4 | 7 | 123.28125 | 0.3852539 |
| 9 | 4 | 8 | 141.09375 | 0.440918 |
| 10 | 4 | 9 | 159.375 | 0.4980469 |
| 11 | 4 | 10 | 177.1875 | 0.5537109 |
| 12 | 4 | 11 | 203.4375 | 0.6357422 |
| 13 | 6 | 11 | 203.4375 | 0.4233398 |
| 14 | 6 | 12 | 229.921875 | 0.4790039 |
| 15 | 6 | 13 | 259.453125 | 0.5405273 |
| 16 | 6 | 14 | 288.984375 | 0.6020508 |
| 17 | 6 | 15 | 307.96875 | 0.6416016 |
| 18 | 6 | 16 | 327.65625 | 0.6826172 |
| 19 | 6 | 17 | 363.515625 | 0.7573242 |
| 20 | 6 | 18 | 398.671875 | 0.8305664 |
| 21 | 6 | 19 | 433.125 | 0.9023438 |
| 22 | 6 | 20 | 468.28125 | 0.9755859 |
| 23 | 6 | 21 | 505.546875 | 1.0532227 |
| 24 | 6 | 22 | 542.8125 | 1.1308594 |
| 25 | 6 | 23 | 577.96875 | 1.2041016 |
| 26 | 6 | 24 | 613.828125 | 1.2788086 |
| 27 | 6 | 25 | 639.84375 | 1.3330078 |
| 28 | 6 | 26 | 666.5625 | 1.3886719 |

For reduction of the TBS, the UE may use a new MCS table (generated such that a code rate r does not exceed a predetermined value) as in Table 11 instead of a legacy MCS table (e.g. Table 7). In this case, the MCS indexes starting from 23 of an MCS table having the code rate r exceeding 1 (e.g. MCS indexes 23 to 28) may not be defined or may not be used. Alternatively, the MCS indexes starting from 22 of the MCS table having the code rate exceeding 0.93 (e.g. MCS indexes 22 to 28) may not be defined or may not be used.

The new MCS table may be generated under the assumption that the number of REs that can be used for PDSCH transmission is, for example, 64, in consideration of resources used for a DRS, an NZP-CSI-RS, and/or a ZP-CSI-RS. Table 12 shows an MCS table which is generated so as not to exceed a code rate of 0.66 under the assumption that 64 REs can be used for PDSCH transmission. For reduction of the TBS, the UE may use a new MCS table (generated such that a code rate r does not exceed a predetermined value) as in Table 12 instead of a legacy MCS table (e.g. Table 7). In this case, MCS indexes starting from 15 having the code rate r exceeding 1 (or 0.93) (e.g. MCS indexes 15 to 28) may not be defined or may not be used.

TABLE 12

| MCS index $I_{MCS}$ | Modulation order $Q_m$ | TBS index $I_{TBS}$ | Number of bits of data per 120 REs | Code rate r |
|---|---|---|---|---|
| 0 | 2 | 0 | 28.125 | 0.2197266 |
| 1 | 2 | 1 | 36.796875 | 0.2874756 |
| 2 | 2 | 2 | 45.234375 | 0.3533936 |
| 3 | 2 | 3 | 58.828125 | 0.4595947 |
| 4 | 2 | 4 | 72.1875 | 0.5639648 |
| 5 | 4 | 4 | 72.1875 | 0.2819824 |
| 6 | 4 | 5 | 89.0625 | 0.3479004 |
| 7 | 4 | 6 | 105.46875 | 0.4119873 |
| 8 | 4 | 7 | 123.28125 | 0.4815674 |
| 9 | 4 | 8 | 141.09375 | 0.5511475 |
| 10 | 4 | 9 | 159.375 | 0.6225586 |
| 11 | 6 | 9 | 159.609375 | 0.6234741 |
| 12 | 6 | 11 | 177.1875 | 0.6921387 |
| 13 | 6 | 11 | 203.203125 | 0.7937622 |
| 14 | 6 | 12 | 229.921875 | 0.8981323 |
| 15 | 6 | 13 | 259.453125 | 1.0134888 |
| 16 | 6 | 14 | 288.984375 | 1.1288452 |
| 17 | 6 | 15 | 307.96875 | 1.2030029 |
| 18 | 6 | 16 | 327.65625 | 1.2799072 |
| 19 | 6 | 17 | 363.515625 | 1.4199829 |
| 20 | 6 | 18 | 398.671875 | 1.557312 |
| 21 | 6 | 19 | 433.125 | 1.6918945 |
| 22 | 6 | 20 | 468.28125 | 1.8292236 |
| 23 | 6 | 21 | 505.546875 | 1.9747925 |
| 24 | 6 | 22 | 542.8125 | 2.1203613 |
| 25 | 6 | 23 | 577.96875 | 2.2576904 |
| 26 | 6 | 24 | 613.828125 | 2.3977661 |
| 27 | 6 | 25 | 639.84375 | 2.4993896 |
| 28 | 6 | 26 | 666.5625 | 2.6037598 |

For reduction of the TBS, if a new MCS table is used so as not to use a TBS of a large value, the UE may perform CQI reporting based on a legacy CQI table. In this case, the eNB may select, from the new MCS table, an MCS index having the number of bits of data (or code rate×modulation order) approximating to the number of bits of data (or code rate×modulation order) mapped to a CQI index reported by the UE and determine that the corresponding MCS table is an MCS table suitable for a channel state of the UE.

Alternatively, for reduction of the TBS, if a new MCS table is used so as not to use a TBS of a large value, the UE may perform CQI reporting based on a new CQI table. In this case, the UE may perform CQI reporting based on the new CQI table matching the new MCS table. Table 13 and Table 14 show new CQI tables.

TABLE 13

| CQI index | Modulation order | r × 1024 | efficiency |
|---|---|---|---|
| 0 | | Out of range | |
| 1 | 2 | 78 | 0.1523 |
| 2 | 2 | 120 | 0.234375 |
| 3 | 2 | 193 | 0.3769531 |
| 4 | 2 | 308 | 0.6015625 |
| 5 | 2 | 449 | 0.8769531 |
| 6 | 4 | 301 | 1.1757813 |
| 7 | 4 | 378 | 1.4765625 |
| 8 | 6 | 327 | 1.9160156 |
| 9 | 6 | 411 | 2.4082031 |
| 10 | 6 | 466 | 2.7304688 |
| 11 | 6 | 567 | 3.3222656 |

TABLE 14

| CQI index | Modulation order | r × 1024 | efficiency |
|---|---|---|---|
| 0 | | Out of range | |
| 1 | 2 | 78 | 0.1523 |
| 2 | 2 | 120 | 0.234375 |
| 3 | 2 | 193 | 0.3769531 |
| 4 | 2 | 308 | 0.6015625 |
| 5 | 4 | 225 | 0.8789063 |
| 6 | 4 | 301 | 1.1757813 |
| 7 | 6 | 252 | 1.4765625 |
| 8 | 6 | 327 | 1.9160156 |

Upon using the MCS table as shown in Table 11, the eNB and the UE may use the CQI table shown in Table 13 for CQI reporting and, upon using the MCS table as shown in Table 12, the eNB and the UE may use the CQI table of Table 14 for CQI reporting.

The eNB of the present invention may determine a TBS of TB(s) for DL data transmission among predetermined TBSs according to any one of the above-described embodiments of the present invention and provide MCS information and resource allocation information corresponding to the TBS to the UE. If the density of RSs and the number of RSs in a PRB are greater than predefined values, the eNB may determine an MCS to be applied to a PDSCH and/or the number of PRBs to be allocated to the UE for PDSCH transmission in consideration of a reduced TBS. For example, if the density of RSs per PRB is greater than a specific value, the eNB may transmit DCI having a larger value than $I_{MCS}$, $I_{TBS}$, and/or $N_{PRB}$ corresponding to a TBS to the UE through a PDCCH. In this case, the relationship between $I_{MCS}$, $I_{TBS}$, and/or $N_{PRB}$ corresponding actually to the MCS table or the TBS table and $I_{MCS}$, $I_{TBS}$, and/or $N_{PRB}$ (i.e. $I_{MCS}'$, $I_{TBS}'$, and/or $N_{PRB}'$) transmitted in the DCI to the UE may be determined according to any one of the embodiments of Method 1 to Method 4 of the present invention regarding the above-described TB S reduction/restriction.

Figure 18:
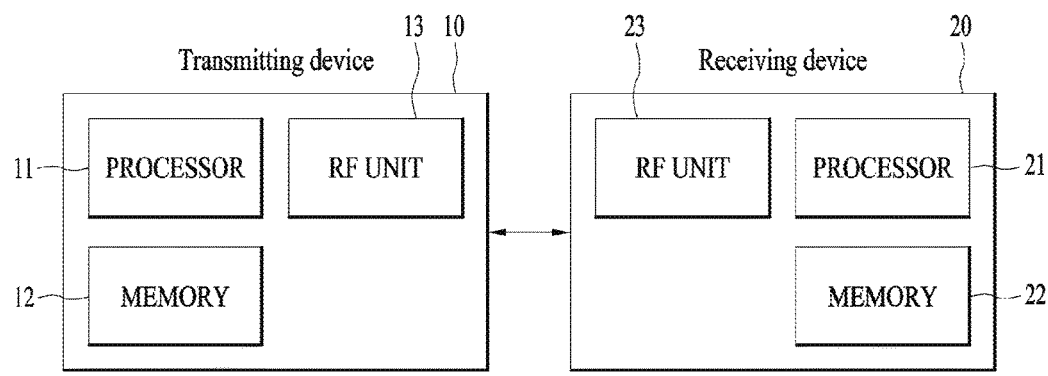
FIG. 18 is a block diagram illustrating elements of a transmitting device 10 and a receiving device 20 for implementing the present invention.

FIG. 18 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may determine a TBS of TB(s) for DL data transmission among predetermined TBSs according to any one of the above-described embodiments of the present invention and generate DCI including MCS information corresponding to the TBS and resource allocation information. The eNB processor may control the eNB RF to transmit the DCI to the UE through a PDCCH. If the density of RSs and the number of RSs in a PRB are greater than predetermined values, the eNB processor may determine an MCS to be applied to a PDSCH and/or the number of PRBs to be allocated to the UE for PDSCH transmission in consideration of a reduced/restricted TBS. For example, if the density of RSs per PRB is greater than a specific value, the eNB processor may transmit DCI having a larger value than $I_{MCS}$, $I_{TBS}$, and/or $N_{PRB}$ corresponding to a TBS of TB(s) transmitted through the PDSCH as the MCS value and/or the resource allocation information and control the eNB RF unit to transmit the DCI to the UE through the PDCCH. In this case, the relationship between $I_{MCS}$, $I_{TBS}$, and/or $N_{PRB}$ corresponding actually to the MCS table or the TBS table and $I_{MCS}$, $I_{TBS}$, and/or $N_{PRB}$ (i.e. $I_{MCS}'$, $I_{TBS}'$, and/or $N_{PRB}'$) transmitted in the DCI to the UE may be determined according to any one of the embodiments of Method 1 to Method 4 of the present invention regarding the above-described TBS reduction/restriction.

The UE processor controls the UE RF unit to monitor PDCCH candidates. For example, the UE processor may detect a PDCCH upon succeeding in decoding a signal received by the UE RF unit. The UE processor may control the UE RF unit to receive DL data through a PDSCH on PRB(s) allocated to the UE based on DCI carried by the PDCCH. The UE processor may acquire TB(s) of the DL data by decoding the PDSCH, i.e. decoding the DL data received through the PDSCH, based on MCS information and resource allocation information in the DCI. The UE processor is aware of an MCS or a modulation order Qm used in the PDSCH based on MCS information in the DCI and on an MCS table and is aware of the size of TB(s) with which a signal in the PDSCH (e.g. DL data) should be restored from a TBS table based on the MCS information and resource allocation information. If the density or number of RSs is greater than a predefined value upon determining TBS(s) used for the PDSCH, the UE processor may determine a reduced TBS according to any one of the embodiments of Method 1 to Method 4 of the present invention regarding the above-described TBS reduction/restriction.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for receiving a downlink signal, the method performed by a user equipment (UE) and comprising:
   receiving downlink control information (DCI) including modulation and coding scheme (MCS) information and including resource allocation information indicating one or more physical resource blocks (PRBs) allocated to the UE;
   receiving downlink data through a physical downlink shared channel (PDSCH) mapped to the one or more PRBs allocated to the UE based on the DCI; and
   determining a transport block size of the downlink data among a plurality of predefined transport block sizes, based on the MCS information and a number, $N_{PRB}'$, of the PRBs allocated to the UE,
   wherein, if the density of downlink reference signals is greater than a reference value, the transport block size is determined based on a number, $N_{PRB}$, of reduced PRBs rather than on $N_{PRB}'$,
   wherein $N_{PRB}$ is determined based on a value obtained by multiplying a positive real number less than 1, $\alpha$ by the $N_{PRB}'$, and
   wherein $\alpha$ is determined based on a ratio, $N_{RE}'/N_{RE}$, of a number, $N_{RE}'$, of resource elements excluding resource elements used to receive the downlink reference signals from $N_{RE}$ to a number, $N_{RE}$, of resource elements excluding resource elements included in orthogonal frequency division multiplexing (OFDM) symbols used to transmit a physical downlink control channel (PDCCH) from resource elements in a resource block.

2. The method according to claim 1,
   wherein $N_{PRB}$ is determined by at least $N_{PRB}=\max\{\text{floor}(N_{PRB}'\times\alpha),1\}$, $N_{PRB}=\text{floor}(N_{PRB}'\times\alpha)$, or $N_{PRB}=\text{ceil}(N_{PRB}'\times\alpha)$.

3. A user equipment (UE) for receiving a downlink signal, the UE comprising:
   a radio frequency (RF) transceiver configured to transmit or receive a signal, and
   a processor configured to control the RF transceiver, the processor configured to:
   control the RF transceiver to receive downlink control information (DCI) including modulation and coding scheme (MCS) information and including resource allocation information indicating one or more physical resource blocks (PRBs) allocated to the UE;
   control the RF transceiver to receive downlink data through a physical downlink shared channel (PDSCH) mapped to the PRBs allocated to the UE based on the DCI; and
   determine a transport block size of the downlink data among a plurality of predefined transport block sizes, based on the MCS information and a number, $N_{PRB}'$, of the PRBs, and
   wherein, if the density of downlink reference signals is greater than a reference value, the processor is configured to determine the transport block size based on a number, $N_{PRB}$, of reduced PRBs rather than on $N_{PRB}'$,
   wherein $N_{PRB}$ is determined based on a value obtained by multiplying a positive real number less than 1, $\alpha$ by the $N_{PRB}'$, and
   wherein $\alpha$ is determined based on a ratio, $N_{RE}'/N_{RE}$, of a number, $N_{RE}'$, of resource elements excluding resource elements used to receive the downlink reference signals from $N_{RE}$ to a number, $N_{RE}$, of resource elements excluding resource elements included in orthogonal frequency division multiplexing (OFDM) symbols used to transmit a physical downlink control channel (PDCCH) from resource elements in a resource block.

4. The UE according to claim 3, wherein $N_{PRB}$ is determined by at least $N_{PRB}=\max\{\text{floor}(N_{PRB}'\times\alpha),1\}$, $N_{PRB}=\text{floor}(N_{PRB}'\times\alpha)$, or $N_{PRB}=\text{ceil}(N_{PRB}'\times\alpha)$.

5. A method for transmitting a downlink signal, the method performed by a base station (BS) and comprising:

determining a transport block size of downlink data among a plurality of predefined transport block sizes according to modulation and coding schemes (MCSs) and the number of physical resource blocks (PRBs);

transmitting, to a user equipment (UE), downlink control information (DCI) including MCS information for transmission of the downlink data and including resource allocation information indicating PRBs allocated to the UE; and transmitting the downlink data through a physical downlink shared channel (PDSCH) mapped to the PRBs allocated to the UE according to the DCI, wherein, if the density of downlink reference signals is greater than a reference value, the transport block size is determined based on a number, $N_{PRB}$, of reduced PRBs rather than on a number, $N_{PRB}'$, of the PRBs allocated to the UE, wherein $N_{PRB}$ is determined based on a value obtained by multiplying a positive real number less than 1, α by the $N_{PRB}'$, and wherein α is determined based on a ratio, $N_{RE}'/N_{RE}$, of a number, $N_{RE}'$, of resource elements excluding resource elements used to receive the downlink reference signals from $N_{RE}$ to a number, $N_{RE}$ of resource elements excluding resource elements included in orthogonal frequency division multiplexing (OFDM) symbols used to transmit a physical downlink control channel (PDCCH) from resource elements in a resource block.

6. The method according to claim 5, wherein $N_{PRB}$ is determined by at least $N_{PRB}=\max\{\text{floor}(N_{PRB}'\times\alpha),1\}$, $N_{PRB}=\text{floor}(N_{PRB}'\times\alpha)$, or $N_{PRB}=\text{ceil}(N_{PRB}'\times\alpha)$.

7. A base station (BS) for transmitting a downlink signal, the BS comprising:

a radio frequency (RF) transceiver configured to transmit or receive a signal, and a processor configured to control the RF transceiver, the processor configured to:

determine a transport block size of downlink data among a plurality of predefined transport block sizes according to modulation and coding schemes (MCSs) and the number of physical resource blocks (PRBs);

control the RF transceiver to transmit, to a user equipment (UE), downlink control information (DCI) including MCS information for transmission of the downlink data and including resource allocation information indicating PRBs allocated to the UE; and control the RF transceiver to transmit the downlink data through a physical downlink shared channel (PDSCH) mapped to the PRBs allocated to the UE according to the DCI, and wherein, if the density of downlink reference signals is greater than a reference value, the transport block size is determined based on a number, $N_{PRB}$, of reduced PRBs rather than on a number, $N_{PRB}'$, of the PRBs allocated to the UE, wherein $N_{PRB}$ is determined based on a value obtained by multiplying a positive real number less than 1, α by the $N_{PRB}'$, and wherein α is determined based on a ratio, $N_{RE}'/N_{RE}$, of a number, $N_{RE}'$, of resource elements excluding resource elements used to receive the downlink reference signals from $N_{RE}$ to a number, $N_{RE}$ of resource elements excluding resource elements included in orthogonal frequency division multiplexing (OFDM) symbols used to transmit a physical downlink control channel (PDCCH) from resource elements in a resource block.

8. The BS according to claim 7, wherein $N_{PRB}$ is determined by at least $N_{PRB}=\max\{\text{floor}(N_{PRB}'\times\alpha),1\}$, $N_{PRB}=\text{floor}(N_{PRB}'\times\alpha)$.

* * * * *